(12) United States Patent
Shiomi et al.

(10) Patent No.: US 7,089,554 B2
(45) Date of Patent: Aug. 8, 2006

(54) PROGRAM EXECUTING APPARATUS

(75) Inventors: Takakazu Shiomi, Hirakata (JP);
Shigeaki Watanabe, Mount Laurel, NJ (US); Yoshinori Imanishi, Higashihiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/910,488

(22) Filed: Aug. 4, 2004

(65) Prior Publication Data

US 2005/0034123 A1 Feb. 10, 2005

Related U.S. Application Data

(60) Provisional application No. 60/492,328, filed on Aug. 5, 2003.

(51) Int. Cl.
*G06F 9/455* (2006.01)
(52) U.S. Cl. ............... 718/1; 709/203; 709/231; 725/86; 348/584; 707/10
(58) Field of Classification Search ............ 718/1–108; 725/86; 709/203, 231; 707/10; 348/584
See application file for complete search history.

(56) References Cited

U.S. PATENT DOCUMENTS

| 6,519,594 | B1* | 2/2003 | Li .................. 707/10 |
| 6,539,433 | B1* | 3/2003 | Tominaga et al. ........ 709/246 |
| 6,686,970 | B1* | 2/2004 | Windle .................. 348/584 |
| 6,874,145 | B1* | 3/2005 | Ye et al. ............... 718/108 |
| 2002/0112002 | A1* | 8/2002 | Abato ................. 709/203 |
| 2003/0028451 | A1* | 2/2003 | Ananian ............... 705/27 |
| 2003/0110503 | A1* | 6/2003 | Perkes .................. 725/86 |
| 2003/0135633 | A1* | 7/2003 | Dror et al. .............. 709/231 |
| 2004/0015316 | A1* | 1/2004 | Sarfati et al. ........... 702/122 |
| 2004/0031058 | A1* | 2/2004 | Reisman ................ 725/112 |
| 2005/0120305 | A1* | 6/2005 | Engstrom et al. ........ 715/760 |

FOREIGN PATENT DOCUMENTS

| JP | 2003-504753 | 2/2003 |
| WO | 01/04743 | 1/2001 |

OTHER PUBLICATIONS

Jones, John, "DVB-MHP/Java TV Data Transport Mechanisms", TOOLS Pacifc 2002, Sydney, Australia, pp. 115-121.*
Beck et al., "Enabling Full Service Surrogates Using The Portable Channel Representation", ACM 1-58113-348, 2001, pp. 376-385.*

* cited by examiner

*Primary Examiner*—Meng-Al T. An
*Assistant Examiner*—Jennifer N. To
(74) *Attorney, Agent, or Firm*—Greenblum & Bernstein, P.L.C.

(57) ABSTRACT

The embedded program comprises a part of the function of the Java program. The embedded program executes the part of the function during the start-up processing period of Java program. Thus, the start-up time appears to be shortened. Further, the present invention provides the information regarding the action state of the embedded program to the Java program, thereby enabling a consistent execution of the Java program on completion of the Java program start-up process.

11 Claims, 24 Drawing Sheets

FIG.3

| Frequency band | Usage | Modulation technique |
|---|---|---|
| 5~130MHz | Out Of Band (OOB) Data exchange between head end and terminals | QPSK |
| 130~864MHz | In-band Ordinary television broadcasting including video and audio | QAM |

FIG.4

| Frequency band | Usage |
|---|---|
| 70~74MHz | Data transmission from head end 101 to terminal apparatuses |
| 10.0~10.1MHz | Data transmission from terminal apparatus A111 to head end 101 |
| 10.1~10.2MHz | Data transmission from terminal apparatus B112 to head end 101 |
| 10.2~10.3MHz | Data transmission from terminal apparatus C113 to head end 101 |

FIG.5

| Frequency band | Usage |
|---|---|
| 150~156MHz | Television channel 1 |
| 156~162MHz | Television channel 2 |
| ⋮ | ⋮ |
| 310~311MHz | Radio channel 1 |
| ⋮ | ⋮ |

FIG.21

| Java program identifier 2001 | Control information 2002 | DSMCC identifier 2003 | Program name 2004 | Priority 2005 |
| --- | --- | --- | --- | --- |
| 701 | autoselect | 1 | /a/ZapperXlet | 200 |
| 702 | present | 1 | /b/PPVXlet2 | 201 |

PROGRAM EXECUTING APPARATUS

CROSS-REFERENCE TO RELATED APPLICATION

This application claims the benefit of U.S. Provisional Application No. 60/492,328, filed Aug. 5, 2003.

TECHNICAL FIELD

The present invention relates to a program executing apparatus that downloads and executes a program, and particularly to a downloaded program inheriting and executing a function that has been executed by an existing program.

BACKGROUND ART

In the present age, Java programs are executed on a variety of information apparatuses. A virtual machine for executing Java programs, known as a JavaVM, is incorporated on a digital TV, a personal computer, a mobile phone, and the like, and executes Java programs.

A function of executing a Java program in an existing digital television is disclosed in Japanese Patent National Publication No. 2003-504753. FIG. 1 is a diagram showing an example configuration of an existing digital television for executing a Java program in which an application manager is implemented in order to manage an application that is loaded via a digital television receiver. A digital TV receiver 3002 receives a broadcast data stream 3021 by a signal monitor 3013. The signal monitor 3013 notifies, to an application manager 3012, whether there is an application being a Java program included in the broadcast data stream 3021 through signal data 3022. The application manager 3012 loads and executes the application using the signal data 3022. When the application is executed, display information is provided from a display manager 3011 in the form of a display context 3023. Furthermore, the display manager 3011 provides appropriate display information to a television monitor 3001.

The application manager 3012, which operates in accordance with a rule 3014, shifts the state of the application to state load, state pause, state active, and state delete. Examples of the rule include "only one application is activated at one time" and "only one application is displayed at one time."

However, the existing technique has a problem that it takes long from when a Java program is executed until when a user can actually receive its function. There are some reasons for it. First, in order to execute a Java program, the JavaVM is required to be activated prior to such execution, but in general, it takes time for a Java VM to get activated. Furthermore, it also takes time until the download of a Java program completes. In a digital TV and an information apparatus and the like, it takes time from when a Java program is decided to be activated until when it is actually activated completely, since time for performing such processing and waiting time are included. Particularly, in an information apparatus in which a Java program is automatically downloaded and executed at power on time, there is time during which nothing is displayed lasts for a while after the power is turned on, which causes a problem that the user becomes anxious. This problem is especially notable in information home appliances such as digital TVs whose CPU processing speed is not so high.

By implementing, as an embedded program, a partial function which is originally supposed to be carried out by a Java program and by executing it while Java program is being activated, the present invention aims at shortening, for the viewer, the time required for start-up processing, and at further providing an information provision unit, between the embedded program and the Java program, that enables the Java program to run in a consistent manner by inheriting the action state of the embedded program upon the completion of starting up the Java program.

DISCLOSURE OF INVENTION

According to the present invention, by a program executing apparatus that has a Java VM for executing a Java program and has an embedded program having a partial function that is a part of a function of the Java program, comprising: an execution unit operable to execute the embedded program and the Java VM; and an information provision unit operable to provide the Java program with information that has been generated as a result of running of the embedded program, it becomes possible for the embedded program, before the Java program is activated, to execute a part of its function, which is then inherited by the Java program. Accordingly, it becomes possible to shortly provide the user with the functionality that is originally provided by the Java program.

Furthermore, with the configuration in which the information provision unit provides the Java program with the information that has been generated as a result of running of the embedded program, before the Java program uses the information provision unit, it becomes possible for the Java program to inherit the state caused by the embedded program.

Moreover, with the configuration in which the information provision unit provides the Java program with the information that has been generated as a result of running of the embedded program, before the Java program is activated, it becomes possible for the Java program to inherit the state caused by the embedded program.

Also, with the configuration in which the information provision unit provides the Java program with the information that has been generated as a result of running of the embedded program, before the embedded program is terminated, it becomes possible for the Java program to inherit the state caused by the embedded program.

Furthermore, with the configuration in which the program executing apparatus further comprises an embedded program termination instruction unit operable to be used by the Java program to give an instruction to terminate the embedded program, it becomes possible for the Java program to explicitly terminate the embedded Java program. Accordingly, it becomes possible to prevent the user from being confused by that the Java program and the embedded program with the same or similar functions run in parallel.

Furthermore, by being equipped with a program executing apparatus comprising: a Java VM that executes a Java program; an input unit operable to accept an input; a receiving unit operable to receive a broadcast; a channel reproduction unit operable to reproduce a channel included in the broadcast received by the receiving unit; a reproduction program that indicates a channel to be reproduced to the channel reproduction unit, based on an instruction from the input unit; an execution unit operable to execute the reproduction program and the Java VM; and an information provision unit operable to provide the Java program with a channel that is last indicated by the reproduction program, it becomes possible for the Java program to take over the channel being reproduced, before the Java program is activated. Accordingly, it becomes possible to shortly provide the user with the reproduction of the channel that is originally performed by the Java program.

Furthermore, with the configuration in which the program executing apparatus further comprises: a first storage unit operable to store the Java program; and a second storage unit operable to store the reproduction program, it becomes possible to execute the stored Java program and reproduction program as many times as necessary, or to switch them.

Moreover, with the configuration in which the channel reproduction unit reproduces video and audio included in the channel, it becomes possible to provide the user with the reproduction of video and audio.

Also, with the configuration in which the program executing apparatus, further comprises a service reproduction unit operable to reproduce video, audio, and a Java program that are included in the channel, it becomes possible to provide the user with the reproduction of video, audio, and the Java program.

Furthermore, with the configuration in which the service reproduction unit is executed by the Java VM partially or fully, and accepts a service to be reproduced from the Java program, it becomes possible for the Java program to reproduce the channel.

Moreover, with the configuration in which the service reproduction unit accepts the service to be reproduced from the reproduction unit, and the reproduction unit reproduces the channel using the channel reproduction unit when the service reproduction unit does not accept the service to be reproduced, and reproduces the channel using the service reproduction unit when the service reproduction unit accepts the service to be reproduced, it becomes possible to reproduce video and audio when the service reproduction cannot be used because it is before the Java VM is activated.

Also, with the configuration in which the program executing apparatus further comprises a service acceptance start notification unit operable to notify that the service reproduction unit has started to accept a service to be reproduced, it becomes possible for the service reproduction unit to start to reproduce the service including the Java program.

Furthermore, by being equipped with a program executing apparatus comprising: a Java VM that executes a Java program; an input unit operable to accept an input; a receiving unit operable to receive a broadcast; a channel reproduction unit operable to reproduce video and audio included in a channel that is included in the broadcast received by the receiving unit; a service reproduction unit operable to reproduce video, audio and data included in the channel that is included in the broadcast received by the receiving unit; a channel identifier accepting unit operable to receive an identifier of a channel to be reproduced and reproduce the channel using the service reproduction unit when it is possible for the service reproduction unit to reproduce a channel, and reproduce the channel using the channel reproduction unit when it is impossible for the service reproduction unit to reproduce a channel; a reproduction program that indicates the identifier of the channel to be reproduced to the channel identifier accepting unit, based on an instruction from the input unit; an execution unit operable to execute the reproduction program and the Java program; and an information provision unit operable to provide the Java program with the channel that is last indicated by the reproduction program to the channel identifier accepting unit, it is only required for the reproduction program to perform the same processing, which allows smaller code size as well as easier implementation.

Moreover, with the configuration in which the program executing apparatus further comprises a channel identifier storage unit operable to store the identifier of the channel accepted by the channel identifier accepting unit, wherein the channel identifier accepting unit provides the service reproduction unit with the identifier of the channel stored in the channel identifier storage unit, when it becomes possible for the service reproduction unit to reproduce a channel, and reproduces the channel, it becomes possible to start reproducing the Java program included in the channel which could not be reproduced when the Java VM was not activated and the service reproduction unit could not be used.

Also, by embodying the present invention as a computer-readable recording medium in which a program capable of functioning as the following units is stored: a Java VM that executes a Java program; an embedded program having a partial function that is a part of a function of the Java program; an execution unit operable to execute the embedded program and the Java VM; and an information provision unit operable to provide the Java program with information that has been generated as a result of running of the embedded program, it becomes possible to improve portability.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 3 shows an example of using frequency bands to be used for communications between a head end and terminal apparatuses in the cable television system according to the present invention;

FIG. 4 shows an example of using frequency bands to be used for communications between the head end and the terminal apparatuses in the cable television system according to the present invention;

FIG. 5 shows an example of using frequency bands to be used for communications between the head end and the terminal apparatuses in the cable television system according to the present invention;

FIG. 14(2) shows exemplary display screens displayed by a display 509 according to the present invention;

FIG. 21 is a schematic diagram showing the contents of XAIT according to the present invention;

BEST MODE FOR CARRYING OUT THE INVENTION

FIRST EMBODIMENT

Figure 1:
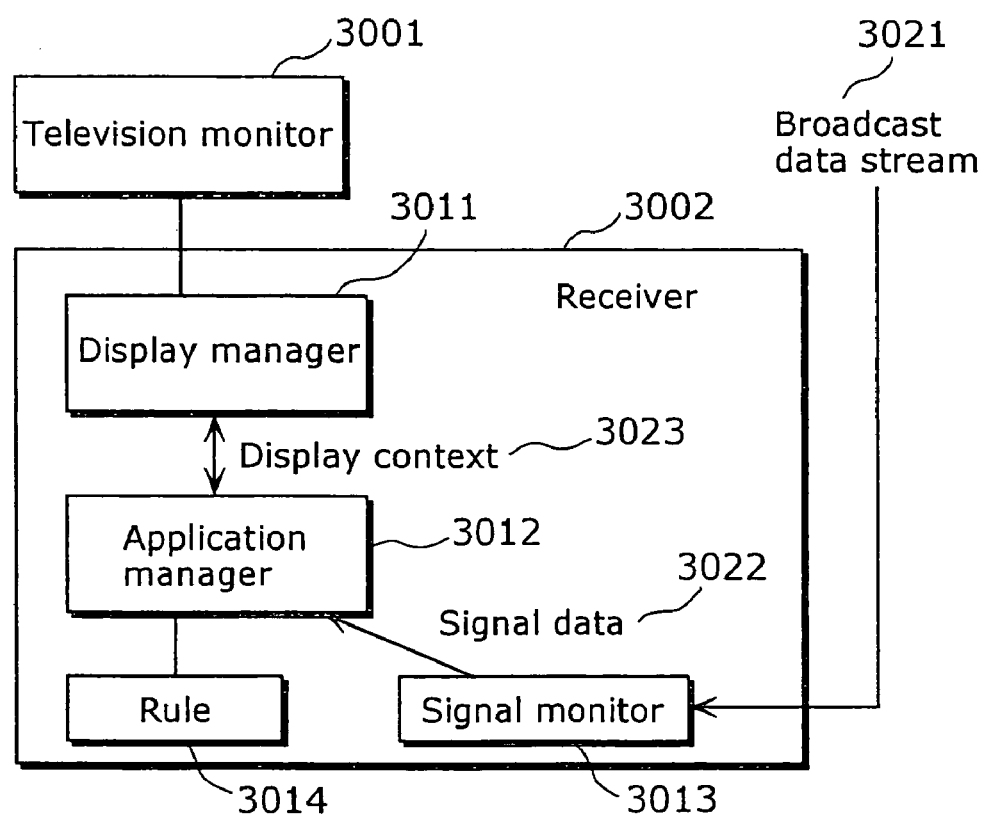
FIG. 1 is a diagram showing a configuration of an existing digital television.
Figure 2:
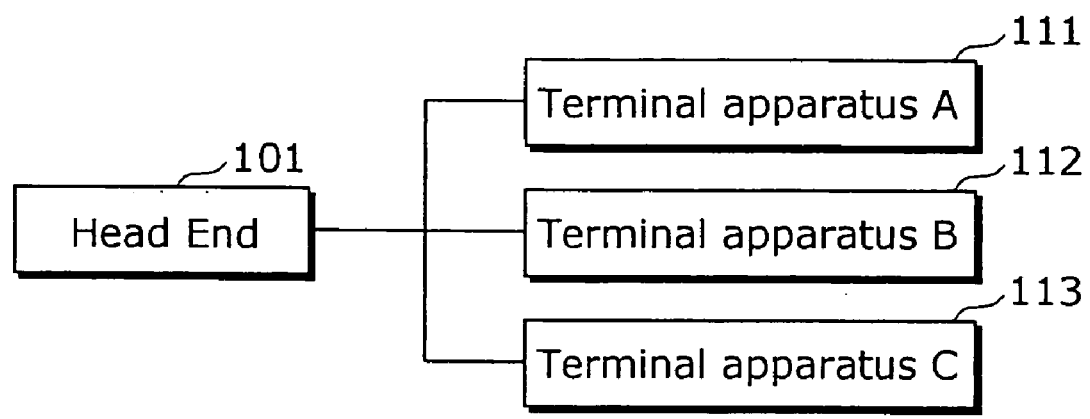
FIG. 2 is a diagram showing a structure of a cable television system according to a first embodiment of the present invention.

An explanation is given of an embodiment of a cable television system according to the present invention with reference to the figures. FIG. 2 is a block diagram showing the relationship among apparatuses composing the cable system, which are a head end 101, and three terminal apparatuses: a terminal apparatus A111, a terminal apparatus B112, and a terminal apparatus C113. In the present embodiment, three terminal apparatuses are connected to one head end, but it is possible to carry out the present invention if an arbitrary number of terminal apparatuses is/are connected to the head end.

The head end 101 transmits, to plural terminal apparatuses, broadcast signals such as video, audio and data, and receives data transmitted from the terminal apparatuses. In order to realize this, frequency bands are divided for use of data transmission between the head end 101, and the terminal apparatus A111, the terminal apparatus B112, and the terminal apparatus C113. FIG. 3 is a table showing an example of divided frequency bands. There are roughly two types of frequency bands: Out of Band (to be abbreviated as OOB) and In-Band. A frequency band of 5~130 MHz is allocated to OOB to be mainly used for data exchange between the head end 101, and the terminal apparatus A111, the terminal apparatus B112, and the terminal apparatus C113. A frequency band of 130 MHz~864 MHz is allocated to In-Band to be mainly used for broadcast channels including video and audio. QPSK is employed for OOB, whereas QAM64 is employed for In-Band as modulation techniques. A detailed explanation of modulation techniques is omitted here, since they are publicly known techniques which are less related to the present invention. FIG. 4 shows a more specific example of how the OOB frequency band is used. A frequency band of 70 MHz~74 MHz is used to transmit data from the head end 101. In this case, all of the terminal apparatus A111, the terminal apparatus B112, and the terminal apparatus C113 receive the same data from the head end 101. Meanwhile, a frequency band of 10.0 MHz~10.1 MHz is used to transmit data from the terminal apparatus A111 to the head end 101. A frequency band of 10.1 MHz~10.2 MHz is used to transmit data from the terminal apparatus B112 to the head end 101. A frequency band of 10.2 MHz~10.3 MHz is used to transmit data from the terminal apparatus C113 to the head end 101. Accordingly, it becomes possible to transmit data unique to each terminal apparatus to the head end 101 from the terminal apparatus A111, the terminal apparatus B112, and the terminal apparatus C113. FIG. 5 shows an example use of the In-Band frequency band. Frequency bands of 150~156 MHz and 156~162 MHz are allocated respectively to a television channel 1 and a television channel 2, and the subsequent frequencies are allocated to television channels at 6 MHz intervals. 310 MHz and the subsequent frequencies are allocated to radio channels at 1 MHz intervals. Each of the above channels may be used either for analog broadcasting or digital broadcasting. In the case of digital broadcasting, data is transmitted in the transport packet format compliant with the MPEG2 specification, in which case data intended for various data broadcasting systems can be transmitted, in addition to audio and video data.

The head end 101 is equipped with a QPSK modulation unit, a QAM modulation unit, and the like in order to transmit suitable broadcast signals to the respective frequency ranges. Moreover, the head end 101 is equipped with a QPSK demodulation unit for receiving data from the terminal apparatuses. Also, the head end 101 is assumed to be further equipped with various devices related to the above modulation units and demodulation unit. However, a detailed explanation of them is omitted here, since the present invention is mainly related to the terminal apparatuses.

The terminal apparatus A111, the terminal apparatus B112, and the terminal apparatus C113 receive and reproduce broadcast signals transmitted from the head end 101. Furthermore, the terminal apparatus A111, the terminal apparatus B112, and the terminal apparatus C113 transmit data unique to each terminal apparatus to the head end 101. In the present embodiment, these three terminal apparatuses shall have the same configuration.

Figure 6:
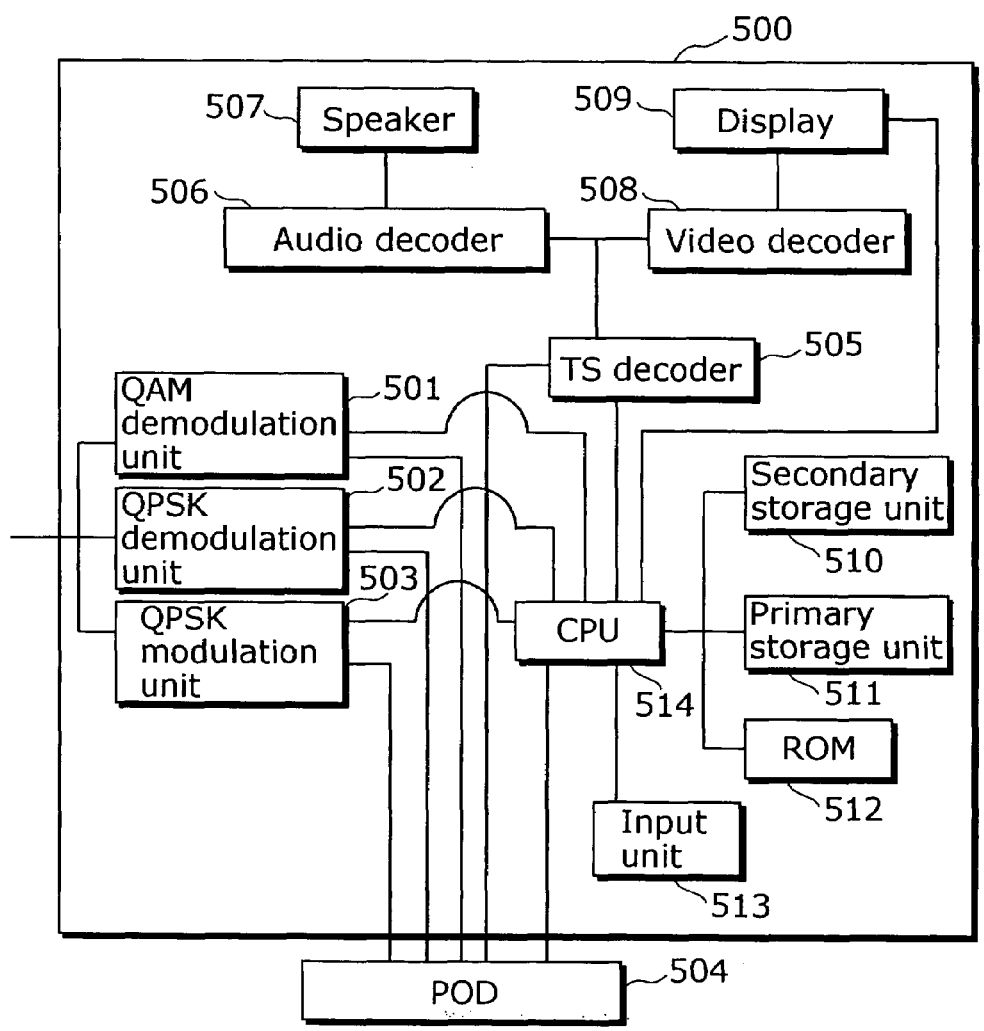
FIG. 6 is a diagram showing a configuration of a terminal apparatus in the cable television system according to the present invention.

FIG. 6 is a block diagram showing a hardware configuration of each terminal apparatus. 500 is a terminal apparatus, which is made up of a QAM demodulation unit 501, a QPSK demodulation unit 502, a QPSK modulation unit 503, a TS decoder 505, an audio decoder 506, a speaker 507, a video decoder 508, a display 509, a secondary storage unit 510, a primary storage unit 511, a ROM 512, an input unit 513, and a CPU 514. Furthermore, a POD 504 can be attached to/detached from the terminal apparatus 500.

Figure 7:
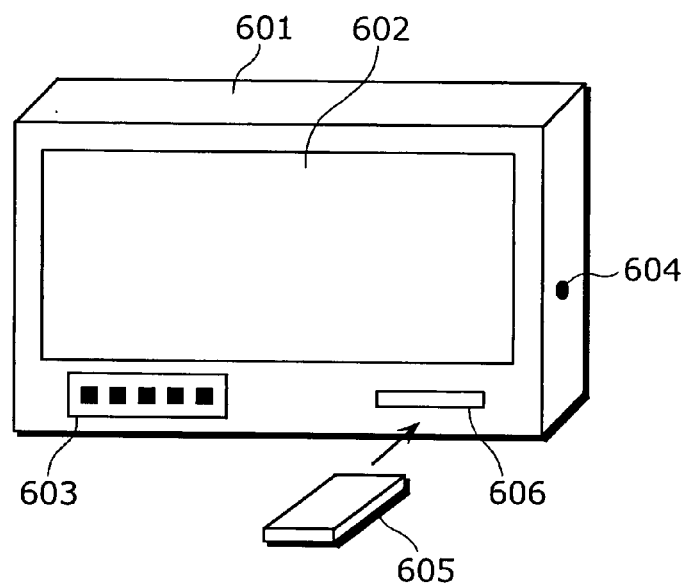
FIG. 7 shows an example external view of the terminal apparatus in the cable television system according to the present invention.

FIG. 7 shows a thin-shaped television, which is an example external view of the terminal apparatus 500.

601 is a steel case of the thin-shaped television, in which all components of the terminal apparatus 500 except for the POD 504 are contained.

602 is a display, which corresponds to the display 509 in FIG. 6.

603 is a front panel unit which is made up of plural buttons and which corresponds to the input unit 513 in FIG. 6.

604 is a signal input terminal to which a cable line is connected for transmitting/receiving signals to and from the head end 101. The signal input terminal is connected to the QAM demodulation unit 501, the QPSK demodulation unit 502, and the QPSK modulation unit 503 shown in FIG. 6.

605 is a POD card corresponding to the POD 504 in FIG. 6. The POD 504 is embodied independently of the terminal apparatus 500 and can be attached to/detached from the terminal apparatus 500, as in the case of the POD card 605 in FIG. 7. A detailed explanation of the POD 504 is given later.

606 is an insertion slot into which the POD 605 is inserted.

Referring to FIG. 6, the QAM demodulation unit 501 demodulates a signal which has been QAM-modulated in and transmitted from the head end 101, according to tuning information that includes a frequency specified by the CPU 514, and passes the resultant to the POD 504.

The QPSK demodulation unit 502 demodulates a signal which has been QPSK-modulated in and transmitted from the head end 101, according to tuning information that includes a frequency specified by the CPU 514, and passes the resultant to the POD 504. The QPSK modulation unit 503 OPSK modulates a signal passed from the POD 504, according to demodulation information that includes a frequency specified by the CPU 514, and transmits the resultant to the head end 101.

As shown in FIG. 7, the POD 504 is detachable from the main body of the terminal apparatus 500. The definition of the connection interface between the main body of the terminal 500 and the POD 504 is given in OpenCable (TM) HOST-POD Interface Specification (OC-SP-HOSTPOD-IF-I12-030210) and in specifications referred to by such specification. Therefore, a detailed description is omitted here, and an explanation is given only of constituent elements relevant to the present invention.

Figure 8:
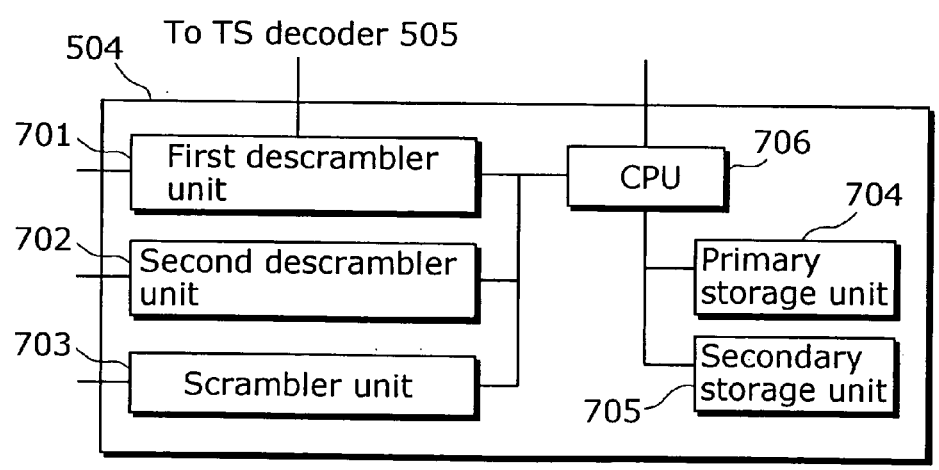
FIG. 8 is a diagram showing a hardware configuration of a POD 504 according to the present invention.

FIG. 8 is a block diagram showing an internal configuration of the POD 504. The POD 504 is made up of a first descrambler unit 701, a second descrambler unit 702, a scrambler unit 703, a primary storage unit 704, a secondary storage unit 705, and a CPU 706.

The first descrambler unit 701 receives a scrambled signal from the QAM demodulation unit 501 of the terminal apparatus 500 under the instruction from the CPU 706, and descrambles such signal. Then, the first descrambler unit 701 transmits the descrambled signal to the TS decoder 505 of the terminal apparatus 500. Information required for descrambler such as a key is provided by the CPU 706 according to need. More specifically, the head end 101 broadcasts several pay channels, and when the user purchased the right to view these pay channels, the first descrambler unit 701 receives required information such as a key from the CPU 706 and performs descrambler. Accordingly, the user can view these pay channels. When required information such as a key is not provided, the first descrambler unit 701 passes the received signal directly to the TS decoder 505 without performing descrambling.

The second descrambler unit 702 receives a scrambled signal from the QPSK demodulation unit 502 of the terminal apparatus 500 under the instruction from the CPU 706, and descrambles such signal. Then, the second descrambler unit 702 passes the descrambled data to the CPU 706.

The scrambler unit 703 scrambles the data received from the CPU 706, under the instruction from the CPU 706, and sends the resultant to the QPSK modulation unit 503 of the terminal apparatus 500.

The primary storage unit 704, a concrete constituent element of which is a primary memory such as a RAM, is intended for storing data temporarily when the CPU 706 performs processing.

The secondary storage unit 705, a concrete constituent element of which is a secondary storage memory such as a flash ROM, is intended for storing a program to be executed by the CPU 706 as well as for storing data which should never be deleted even when the power is turned off.

Figure 9:
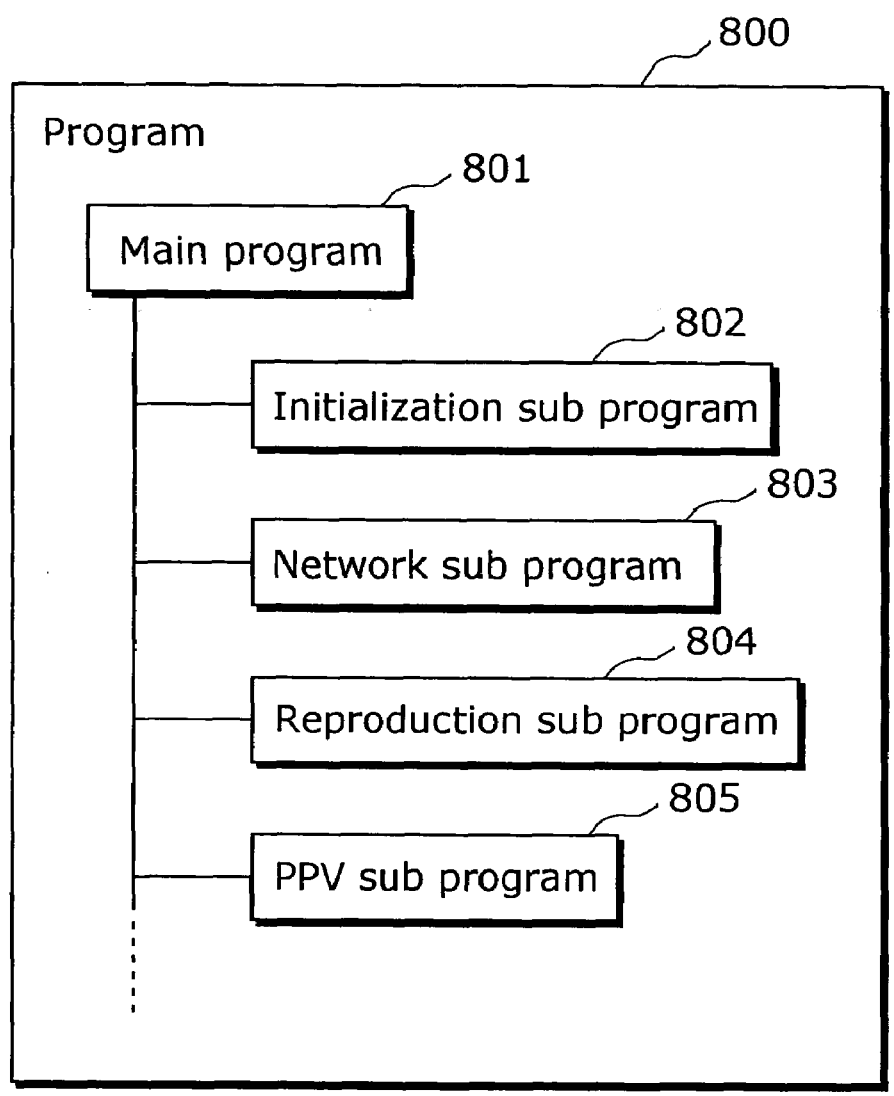
FIG. 9 is a diagram showing a structure of a program stored in the POD 504 according to the present invention.

The CPU 706 executes the program stored in the secondary storage unit 705. The program is made up of plural sub programs. FIG. 9 shows an example of the program stored in the secondary storage unit 705. In FIG. 9, a program 800 is made up of plural sub programs including a main program 801, an initialization sub program 802, a network sub program 803, a reproduction sub program 804, and a PPV sub program 805.

Here, PPV, which is an abbreviation of Pay Per View, refers to a service that allows the user to view a certain program such as a movie on a chargeable basis. When the user enters his/her personal identification number, the fact that the user purchased the right to view the program is notified to the head end 101, and the program is descrambled. Accordingly, the user can view such program. This viewing of the program requires the user to pay for the purchase at later date.

The main program 801, which is the sub program activated by the CPU 706 first of all when the power is turned on, controls the other sub programs.

The initialization sub program 802, which gets activated by the main program 801 when the power is turned on, carries out information exchange and the like with the terminal apparatus 500 to perform initialization processing. This initialization processing is defined in detail in OpenCable (TM) HOST-POD Interface Specification (OC-SP-HOSTPOD-IF-I12-030210) and in specifications referred to by such specification. Furthermore, the initialization sub program 802 also performs initialization processing not defined in these specifications. Here, a part of such initialization processing is introduced. When the power is turned on, the initialization sub program 802 notifies the QPSK demodulation unit 502 of a first frequency stored in the secondary storage unit 705 via the CPU 514 of the terminal apparatus 500. The QPSK demodulation unit 502 performs tuning using the provided first frequency, and transmits the resulting signal to the secondary scrambler unit 702. Moreover, the initialization sub program 802 provides the secondary descrambler unit 702 with descrambling information such as a first key stored in the secondary storage unit 705. As a result, the secondary descrambler unit 702 performs descrambling and passes the resultant to the CPU 702 executing the initialization sub program 802. Accordingly, the initialization sub program 802 can receive the information. In the present embodiment, the initialization sub program 802 receives information via the network sub program 803. A detailed description on this is given later.

Furthermore, the initialization sub program 802 notifies the QPSK modulation unit 503 of a second frequency stored in the secondary storage unit 705 via the CPU 514 of the terminal apparatus 500. The initialization sub program 802 provides the scrambler unit 703 with scrambling information stored in the secondary storage unit 705. When the initialization sub program 802 provides, via the network sub program 803, the scrambler unit 703 with information required to be sent, the scrambler unit 703 scrambles the data using the provided scrambling information, and provides the scrambled data to the QPSK modulation unit 503. The QPSK modulation unit 503 modulates the scrambled information which it received, and sends the modulated information to the head end 101.

As a result, it becomes possible for the initialization sub program 802 to carry out a bilateral communication with the head end 101 via the terminal apparatus 500, the secondary descrambler unit 702, the scrambler unit 703, and the network sub program 803.

The network sub program 803, which is used by plural sub programs such as the main program 801 and the initialization sub program 802, is a sub program intended for carrying out a bilateral communication with the head end 101. More specifically, the network sub program 803 behaves as if other sub programs using the network sub program 803 were carrying out a bilateral communication with the head end 101 in accordance with TCP/IP. A detailed explanation of TCP/IP is omitted here, since it is a publicly known technique that specifies the protocols to be used when exchanging information between plural terminals. When activated by the initialization sub program 802 at power-on time, the network sub program 803 notifies, via the terminal apparatus 500, the head end 101 of an MAC address (an abbreviation of Media Access Control) which is an identifier for identifying the POD 504 and which is stored in the secondary storage unit 705 beforehand, so as to request for obtaining an IP address. The head end 101 notifies the POD 504 of the IP address via the terminal apparatus 500, and the network sub program 803 stores such IP address in the primary storage unit 704. From then on, the head end 101 and the POD 504 communicate with each other using such IP address as the identifier of the POD 504.

The reproduction sub program 804 provides the first descrambler unit 701 with descrambling information such as a second key stored in the secondary storage unit 705 as well as descrambling information such as a third key provided by the terminal apparatus 500, so as to allow descrambling to be performed. Furthermore, the reproduction sub program 804 receives, via the network sub program 803, information indicating that the signal inputted in the first descrambler unit 701 is a PPV channel. On the notification that the signal is a PPV channel, the reproduction sub program 804 activates the PPV sub program 805.

When activated, the PPV sub program 805 displays, on the terminal apparatus 500, a message that urges the user to purchase the program, and accepts an input from the user. More specifically, when information wished to be displayed on the screen is sent to the CPU 514 of the terminal apparatus 500, a program running on the CPU 514 of the terminal apparatus 500 shows the message on the display 509 of the terminal apparatus 500. Then, when the user enters the personal identification number via the input unit 513 of the terminal apparatus 500, the CPU 514 of the terminal apparatus 500 accepts it, and sends it to the PPV sub program 805 running on the CPU 706 of the POD 504. The PPV sub program 805 sends, to the head end 101, the accepted personal identification number via the network sub program 803. When such personal identification number is valid, the head end 101 notifies, via the network sub program 803, the PPV sub program 805 of descrambling information required for descrambling such as a fourth key. The PPV sub program 805 provides the first descrambler unit 701 with the accepted descrambling information such as the fourth key, and then the first descrambler unit 701 descrambles the input signal.

Figure 10:
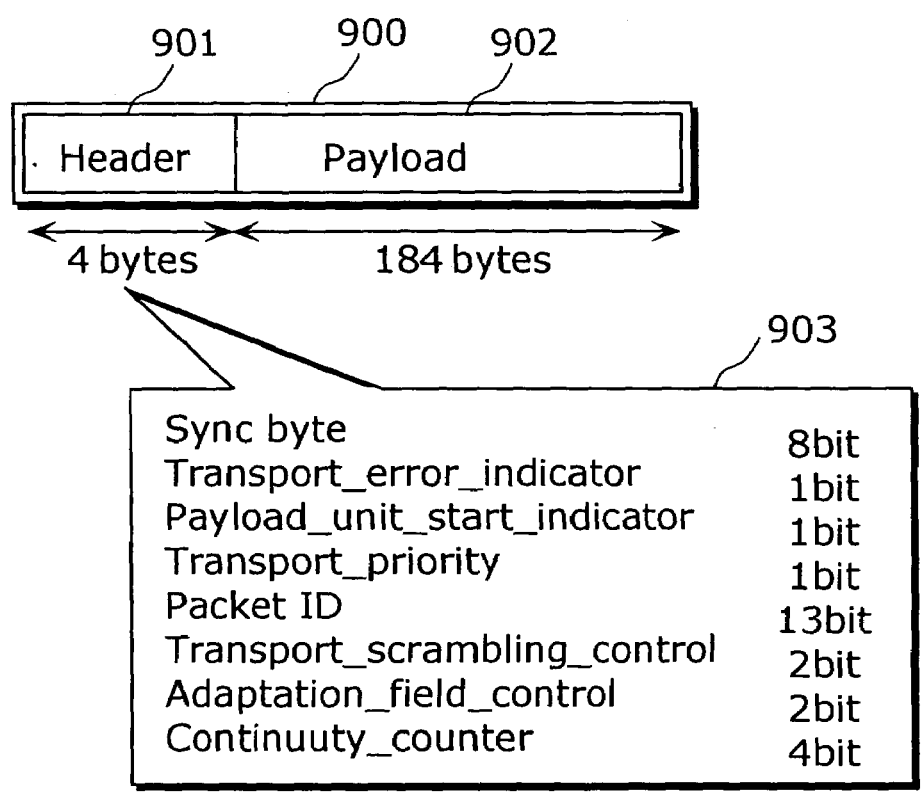
FIG. 10 is a diagram showing a structure of a packet defined in the MPEG standard.
Figure 11:
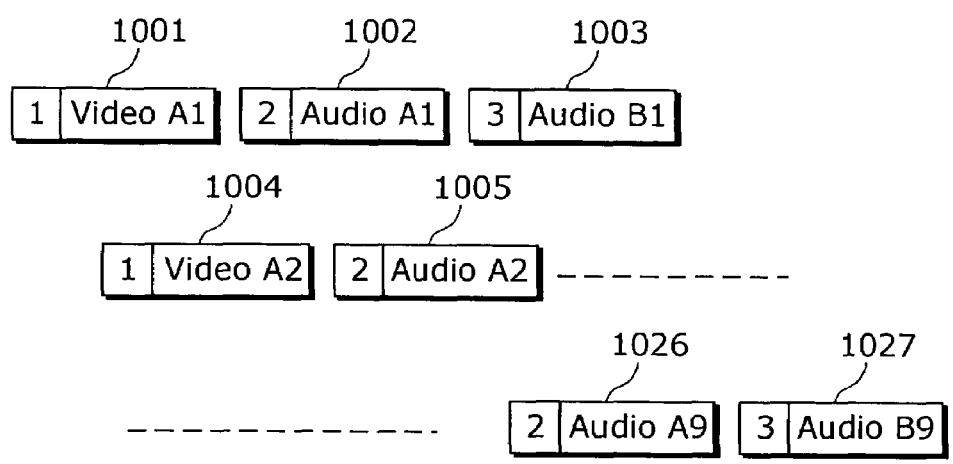
FIG. 11 shows an example of an MPEG2 transport stream.

Referring to FIG. 6, the TS decoder 505 performs filtering on the signal accepted from the POD 504, and passes necessary data to the audio decoder 506, the video decoder 508, and the CPU 514. Here, the signal sent from the POD 504 is an MPEG2 transport stream. A detailed description about an MPEG2 transport stream is given in the MPEG specification ISO/IEC138181-1, and therefore it is not explained in detail in the present embodiment. An MPEG2 transport stream is composed of plural fixed length packets, and a packet ID is assigned to each packet. FIG. 10 is a diagram showing the structure of a packet. 900 is a packet, which contains fixed length 188 bytes. The top four bytes is a header 901 storing information for identifying the packet, and the other 184 bytes is a payload 902 storing information wished to be carried. 903 shows the breakdown of the header 901. A packet ID is included in 13 bits from the 1st to the 12th~24th bit. FIG. 11 is a schematic diagram illustrating plural packet strings to be transmitted. A packet 1001 contains a packet ID "1" in its header and includes the first information of video A in its payload. A packet 1002 contains a packet ID "2" in its header and includes the first information of audio A in its payload. A packet 1003 contains a packet ID "3" in its header and includes the first information of audio B in its payload.

A packet 1004 contains the packet ID "1" in its header and includes the second information of the video A in its payload, which is the subsequent information of the packet 1001. Similarly, packets 1005, 1026, and 1027 carry subsequent data of the other packets. By concatenating the contents of the payloads of packets with the same packet IDs in the above manner, it is possible to reproduce video and audio in successive order.

Refer to FIG. 11. When the CPU 514 indicates, to the TS decoder 505, the packet ID "1" as well as "the video decoder 508" as an output destination, the TS decoder 505 extracts packets with the packet ID "1" from the MPEG2 transport stream received from the POD 504, and passes them to the video decoder 508. In FIG. 11, therefore, only the video data is passed over to the video decoder 508. At the same time, when the CPU 514 indicates, to the TS decoder 505, the packet ID "2" as well as "the audio decoder 506", the TS decoder 505 extracts packets with the packet ID "2" from the MPEG2 transport stream received from the POD 504, and passes them to the audio decoder 506. In FIG. 11, only the audio data is passed over to the video decoder 508.

This processing of extracting only necessary packets according to packet IDs corresponds to filtering to be performed by the TS decoder 505. The TS decoder 505 is capable of performing more than one filtering processing simultaneously at the instruction from the CPU 514.

Referring to FIG. 6, the audio decoder 506 concatenates audio data embedded in the packets in the MPEG2 transport stream provided by the TS decoder 505, performs digital-to-analog conversion on the concatenated data, and outputs the resultant to the speaker 507.

The speaker 507 outputs the signal provided by the audio decoder 506 as audio. The video decoder 508 concatenates video data embedded in the packets in the MPEG2 transport stream provided by the TS decoder 505, performs digital-to-analog conversion on the concatenated data, and outputs the resultant to the display 509.

The display 509, a concrete constituent element of which is a CRT or a liquid crystal and the like, outputs a video signal provided by the video decoder 508 and displays a message specified by the CPU 514, and so forth.

The secondary storage unit 510, concrete constituent elements of which are a flash memory, a hard disk, and the like, stores and deletes data and programs specified by the CPU 514. Stored data and programs are referred to by the CPU 514. The stored data and programs are kept in storage even while the terminal apparatus 500 is powered off.

The primary storage unit 511, concrete constituent elements of which is a RAM and the like, temporarily stores data and programs specified by the CPU 514 and deletes them. Stored data and programs are referred to by the CPU 514. The stored data and programs are deleted when the terminal apparatus 500 gets powered off.

The ROM 512 is a read-only memory device, concrete constituent elements of which are a ROM, a CD-ROM, and a DVD, and the like. The ROM 512 stores a program to be executed by the CPU 514.

Figure 12:
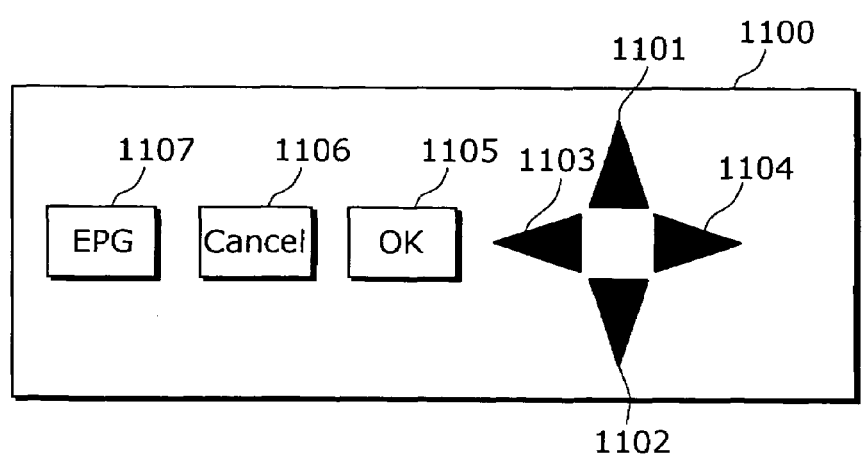
FIG. 12 shows an example external view of an input unit 513 in the case where it is configured in the form of a front panel.

The input unit 513, concrete constituent elements of which are a front panel or a remote controller, accepts an input from the user. FIG. 12 shows an example of the input unit 513 in the case where it is configured in the form of a front panel. 1100 is a front panel, which corresponds to the front panel unit 603 shown in FIG. 7. Such front panel 1100 is made up of seven buttons: an up-cursor button 1101, a down-cursor button 1102, a left-cursor button 1103, a right-cursor button 1104, an OK button 1105, a cancel button 1106, and an EPG button 1107. When the user presses down a button, the identifier of such pressed button is notified to the CPU 514.

The CPU 514 executes the program stored in the ROM 512. According to instructions from such program to be executed, the CPU 514 controls the QAM demodulation unit 501, the QPSK demodulation unit 502, the QAM modulation unit 503, the POD 504, the TS decoder 505, the display 509, the secondary storage unit 510, the primary storage unit 511, and the ROM 512.

Figure 13:
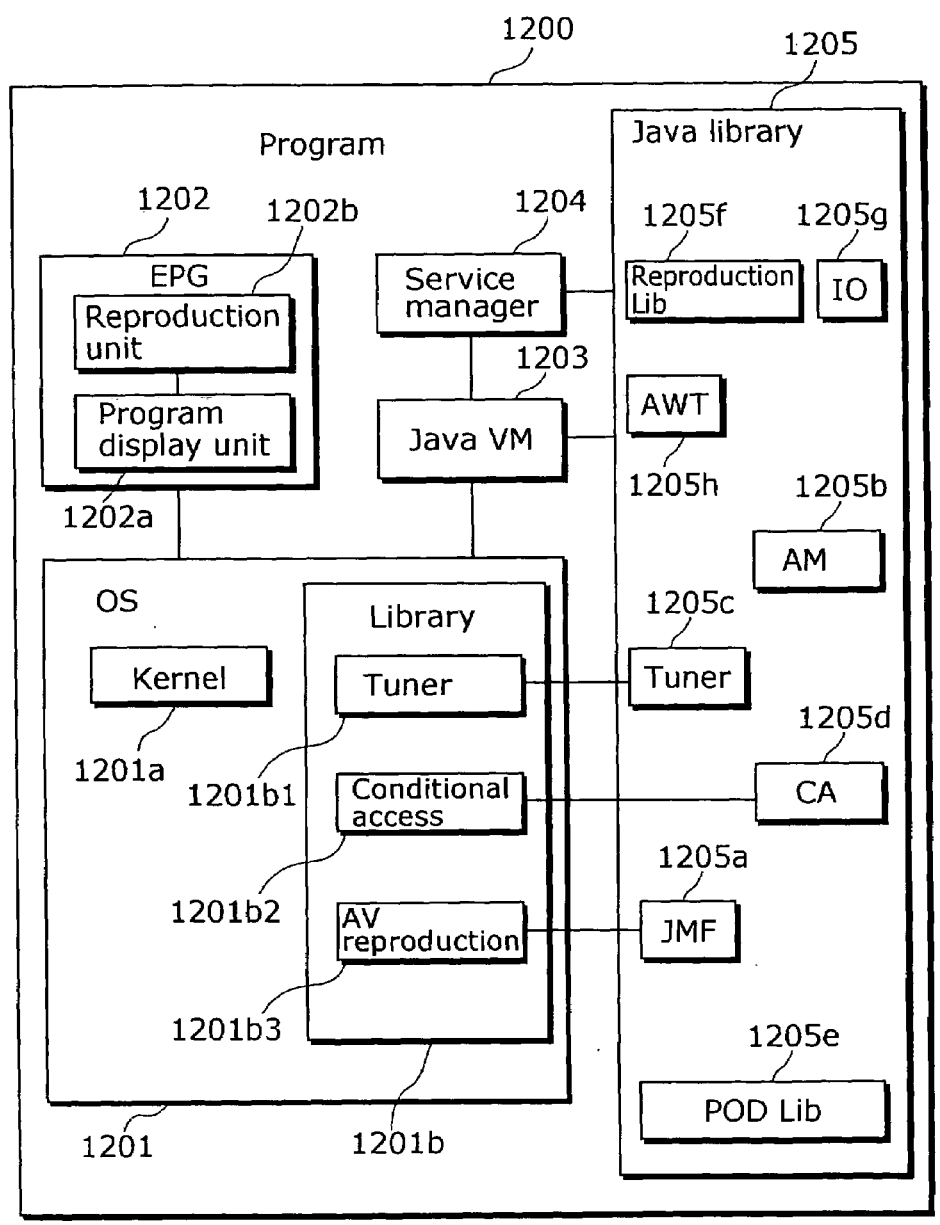
FIG. 13 is a diagram showing a structure of the program stored in a terminal apparatus 500 according to the present invention.

FIG. 13 is a diagram showing an example structure of the program that is stored in the ROM 512 and executed by the CPU 514.

A program 1200 is made up of plural sub programs. To be more specific, the program 1200 is made up of an OS 1201, an EPG 1202, a JavaVM 1203, a service manager 1204, and a Java library 1205.

The OS 1201 is a sub program to be activated by the CPU 514 when the terminal apparatus 500 is powered on. The OS 1201 is an abbreviation of operating system, an example of which is Linux and the like. The OS 1201 is a generic name for a publicly known art made up of a kernel 1201a for executing a sub program in parallel with another sub program and of a library 1202b, and therefore a detailed explanation is omitted. In the present embodiment, the kernel 1201a of the OS 1201 executes the EPG 1202 and the JavaVM 1203 as sub programs. Meanwhile, the library 1202b provides these sub programs with plural functions required for controlling the constituent elements of the terminal apparatus 500.

In the present embodiment, the library 1201b includes a tuner 1201b1, conditional access 1201b2, and AV reproduction 1202b3, as an example of its function. The tuner 1201b1 receives tuning information that includes a frequency from another sub program or the Tuner 1205c of the Java library 1205, and then passes it over to the QAM demodulation unit 501. Accordingly, it is possible for the QAM demodulation unit 501 to perform demodulation based on the provided tuning information, and pass the demodulated data to the POD 504. As a result, the other sub programs and the Tuner 1205c of the Java library 1205 can control the QAM demodulation unit via the library 1201b.

The conditional access 1201b2 receives information required for descrambling from another sub program or the CA 1205d of the Java library 1205, and provides it to the POD 504. As a result, the POD 504 descrambles the signal provided from the QAM demodulation unit 501 based on the provided information, and passes the resulting signal to the TS decoder 505.

Figure 14:
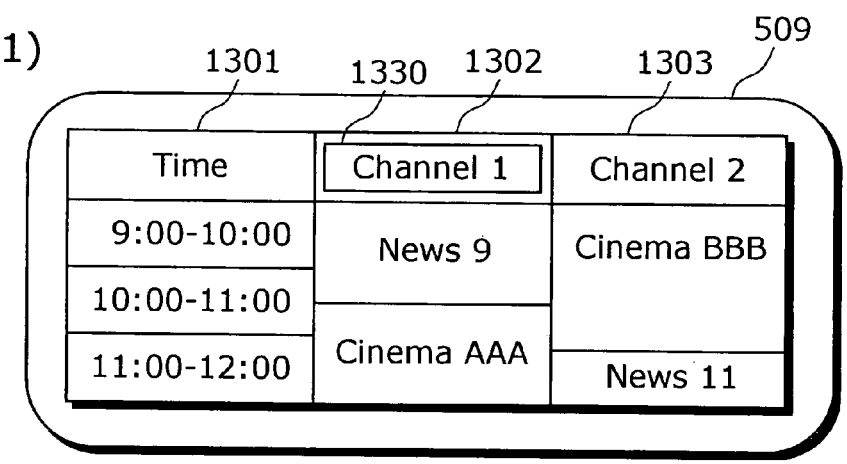
FIG. 14(1) shows exemplary display screens displayed by a display 509 according to the present invention.
Figure 14:
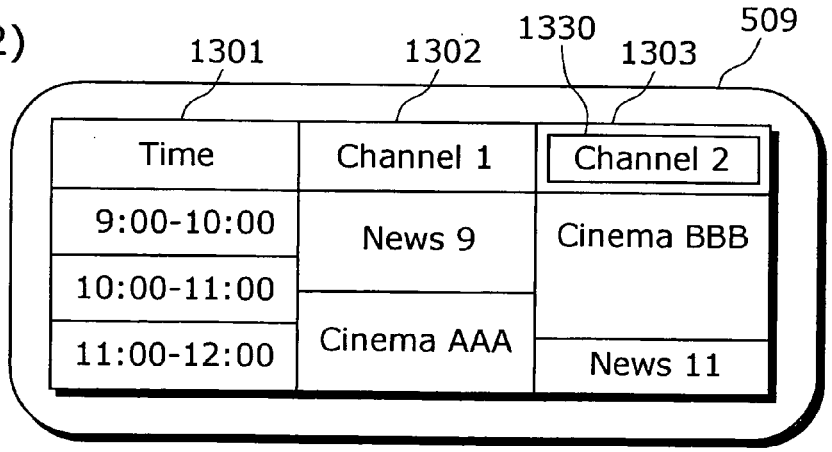

The AV reproduction 1202b3 receives an audio packet ID and a video packet ID from another sub program or the JMF 1205a of the Java library 1205, and provides the TS decoder 505 with a set of the received audio packet ID and the audio decoder 506 as an output destination, as well as a set of the received video packet ID and the video decoder 508 as an output destination. As a result, the TS decoder 505 performs filtering based on the provided packet IDs and output destinations, and reproduces video and audio. The EPG 1202 is made up of a program display unit 1202a for displaying a list of programs to the user as well as for accepting an input from the user, and a reproduction unit 1202b for selecting channels. Here, EPG is an abbreviation of Electric Program Guide. The EPG 1202 gets activated by the kernel 1201a when the terminal apparatus 500 is powered on. In the activated EPG 1202, the program display unit 1202a and the reproduction unit 1202a are activated concurrently. When activated, the program display unit 1202a waits for an input from the user via the input unit 513 of the terminal apparatus 500. Here, in the case where the input unit 513 takes a form of the front panel illustrated in FIG. 12, when the user presses down the EPG button 1107 on the input unit 513, the CPU 514 is notified of the identifier of such EPG button. The program display unit 1202a of the EPG 1202, which is a sub program running on the CPU 514, accepts this identifier, and shows program information on the display 509. FIGS. 14(1) and (2) show examples of a program table displayed on the display 509. See FIG. 14(1). The Program information is displayed on the display 509 in a grid pattern. A column 1301 describes time information. A column 1302 describes a channel name "Channel 1" and programs to be broadcast during time periods corresponding to the respective times described in the column 1301. It is shown that a program "News 9" is broadcast from 9:00 to 19:30, and "Cinema AAA" is broadcast from 19:30 to 12:00 on "Channel 1". A column 1303 describes a channel name "Channel 2" and programs to be broadcast during time periods corresponding to the respective times described in the column 1301, as in the case of the column 1302. A program "Cinema BBB" is broadcast from 9:00 to 11:00, and "News 11" is broadcast from 11:00 to 12:00. 1330 is a cursor. The cursor 1330 moves at the press of the left-cursor 1103 or the right-cursor 1104 on the front panel 1100. When the right-cursor 1104 is pressed down in the state illustrated in FIG. 14(1), the cursor 1330 moves toward right as shown in FIG. 14(2). Meanwhile, when the left-cursor 1103 is pressed down in the state illustrated in FIG. 14(2), the cursor 1330 moves toward left as shown in FIG. 14(1).

When the OK button 1105 on the front panel 1100 is pressed down in the state shown in FIG. 14(1), the program display unit 1202a notifies the reproduction unit 1202b of the identifier of "Channel 1". Meanwhile, when the OK button 1105 on the front panel 1100 is pressed down in the state shown in FIG. 14(2), the program display unit 1202a notifies the reproduction unit 1202b of the identifier of "Channel 2".

Furthermore, the program display unit 1202a periodically stores program information to be displayed from the head end 101 into the primary storage unit 511 via the POD 504. Generally, it takes time to obtain program information from the head end. However, it becomes possible to quickly display a program table by displaying the program information that is pre-stored in the primary storage unit 511 at the press of the EPG button 1107 of the input unit 513.

Figure 15:
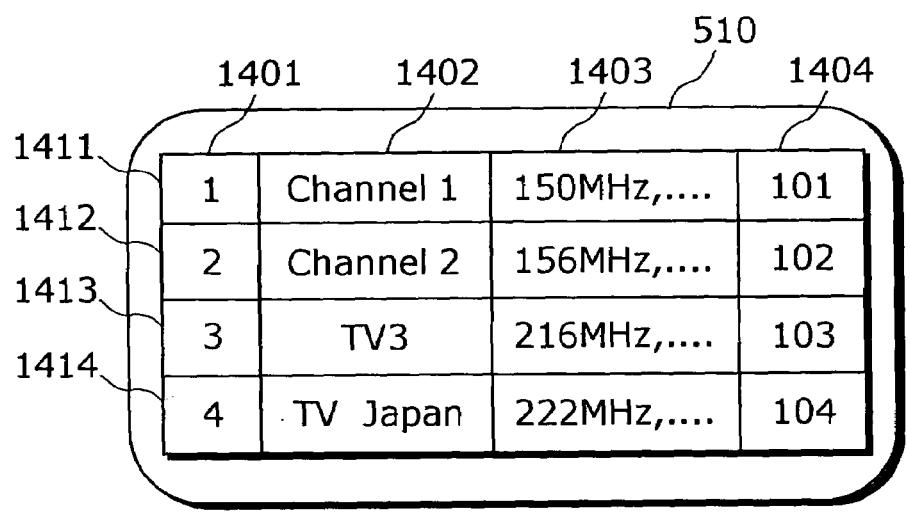
FIG. 15 shows an example of information stored in a secondary storage unit 510 according to the present invention.

The reproduction unit 1202b reproduces the channel using the received identifier of the channel. In other words, it reproduces video and audio that make up the channel. The relationship between channel identifiers and channels is pre-stored by the secondary storage unit 510 as channel information. FIG. 15 shows an example of the channel information stored in the secondary storage unit 510. The channel information is stored in tabular form. A column 1401 describes the identifiers of channels. A column 1402 describes channel names. A column 1403 describes tuning information. Here, the tuning information is represented by values to be provided to the QAM demodulation unit 501 such as frequency, transmission rate, and coding ratio. A column 1404 describes program numbers. Program numbers are numbers used to identify PMTs defined by the MPEG2 standard. A description about PMT is given later. Each of lines 1411~1414 indicates a set of the identifier, channel name, and tuning information of each channel. The line 1411 describes a set that includes "1" as an identifier, "Channel 1" as a channel name, a frequency of "150 MHz" as tuning information, and "101" as a program number. The reproduction unit 1202b passes the identifier of the received channel directly to the service manager in order to reproduce the channel.

Figure 16:
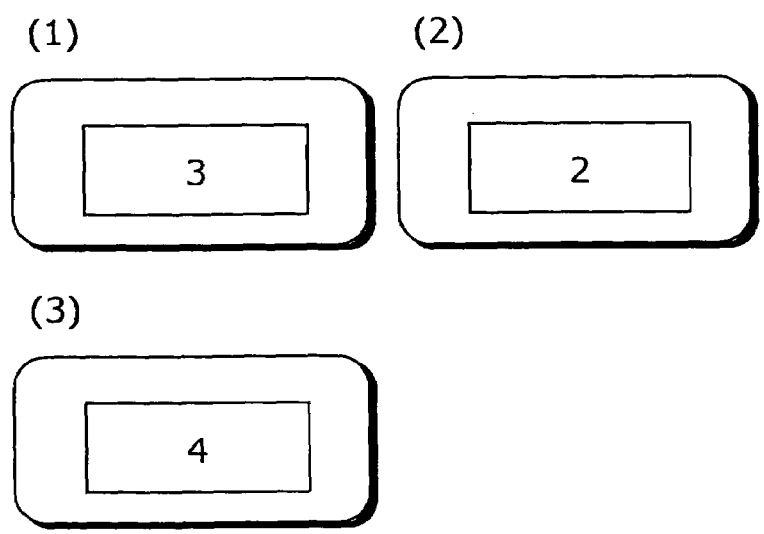
FIG. 16 shows an example of information stored in the secondary storage unit 510 according to the present invention.

Moreover, when the user presses down the up-cursor 1101 and the down-cursor 1102 on the front panel 1100 while the reproduction is taking place, the reproduction unit 1202b receives a notification about such press by the user from the input unit 513 via the CPU 514, and switches the channel being reproduced to another one. When the up-cursor 1101 is pressed down, a channel with a channel identifier whose value is smaller by one than that of the currently reproduced channel is reproduced, whereas when the down-cursor 1102 is pressed down, a channel with a channel identifier whose value is larger by one than that of the currently reproduced channel is reproduced. First, the reproduction unit 1202b stores, in the secondary storage unit 512, the identifier of the channel that is currently reproduced. (1), (2), and (3) in FIG. 16 show example identifiers of channels stored in the secondary storage unit 512. (1) in FIG. 16 shows that an identifier "3" is stored, and it is shown by referring to FIG. 15 that a channel with the channel name "TV 3" is being reproduced. When the user presses down the up-cursor 1101 in a state illustrated in (1) in FIG. 16, the reproduction unit 1202b refers to the channel information shown in FIG. 15, and passes the identifier "2" of a channel with the channel name of "Channel 2" to the service manager in order to newly reproduce a channel with the channel name of "Channel 2", which is a channel with an identifier whose value is smaller by one than that of the currently reproduced channel in the table. At the same time, the reproduction unit 1202b rewrites the identifier into the channel identifier "2" stored in the secondary storage unit 512. (2) in FIG. 16 shows such rewritten channel identifier. Meanwhile, when the user presses down the down-cursor 1102 in the state illustrated in (1) in FIG. 16, the reproduction unit 1202b refers to the channel information shown in FIG. 15, and passes the identifier "4" of a channel with the channel name of "TV Japan" to the service manager in order to newly reproduce a channel with the channel name of "TV Japan", which is a channel with an identifier whose value is larger by one than that of the currently reproduced channel in the table. At the same time, the reproduction unit 1202b rewrites the identifier into the channel identifier "4" stored in the secondary storage unit 512. (3) in FIG. 16 shows such rewritten channel identifier. Channel identifiers remain stored even while the terminal apparatus 500 is turned off, since they are stored in the secondary storage unit 512.

Furthermore, when activated at power-on time of the terminal apparatus 500, the reproduction unit 1202b reads out a channel identifier stored in the secondary storage unit 512, and then passes such channel identifier to the service manager. Accordingly, it becomes possible for the terminal apparatus 500 to start reproducing, at power-on time, the channel which was last reproduced, last time it was in operation.

The JavaVM 1203 is a Java virtual machine that sequentially analyzes and executes programs written in the Java (TM) language. Programs written in the Java language are compiled into intermediate codes known as byte codes which do not depend on hardware. The Java virtual machine is an interpreter that executes such byte codes. Some of the Java virtual machines translate the byte codes into an executable form which can be interpreted by the CPU 514 and pass the resultant to the CPU 514, which executes it. The JavaVM 1203 gets activated, with a Java program to be executed being specified by the kernel 1201a. In the present embodiment, the kernel 1201a specifies the service manager 1204 as a Java program to be executed. A detailed commentary on the Java language is given in many books that include "Java Language Specification" (ISBN 0-201-63451-1). Therefore, a detailed description about it is omitted here. Also, a detailed commentary on the operation of the Java VM itself is given in many books that include "Java Virtual Machine Specification" (ISBN 0-201-63451-X). Therefore, a detailed description about it is omitted here.

The service manager 1204, which is a Java program written in the Java language, is executed by the JavaVM 1203 sequentially. It is possible for the service manager 1204 to call and to be called by another sub program not written in the Java language through the JNI (Java Native Interface). A commentary on the JNI is given in many books that include "Java Native Interface". Therefore, a detailed description about it is omitted here.

The service manager 1204 accepts the identifier of the channel from the reproduction unit 1202b through the JNI.

First, the service manager 1204 passes the identifier of the channel to a Tuner 1205c in the Java library 1205 so as to request for tuning. The Tuner 1205c refers to the channel information stored in the secondary storage unit 510 to obtain the tuning information. Assuming that the service manager 1204 passes the identifier "2" of the channel to the Tuner 1205c, the Tuner 1205c refers to the line 1412 shown in FIG. 15, and obtains the tuning information "156 MHz," corresponding to the channel. The Tuner 1205c passes the tuning information to the QAM demodulation unit 501 via the tuner 1201b1 of the library 1201b in the OS 1201. The QAM demodulation unit 501 demodulates the signal sent from the head end 101 according to the provided tuning information, and passes the resultant signal to the POD 504.

Next, the service manager 1204 requests a CA 1205b inside the Java library 1205 to perform descrambling. The CA 1205d provides the POD 504 with information required for descrambling through the conditional access 1201b2 of the library 1201b in the OS 1201. On the basis of such provided information, the POD 504 descrambles the signal provided by the QAM demodulation unit 501, and passes the resultant signal to the TS decoder 505.

Next, the service manager 1204 provides a JMF 1205a inside the Java library 1205 with the identifier of the channel, so as to request for the reproduction of the video and audio.

Figure 17:
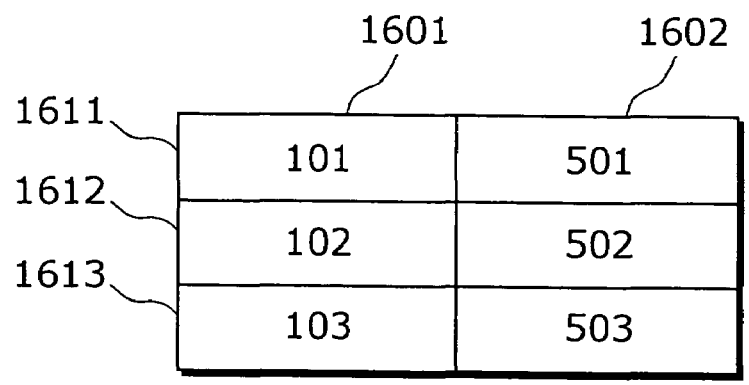
FIG. 17 is a schematic diagram showing the contents of a PAT specified in the MPEG2 standard according to the present invention.
Figure 18:
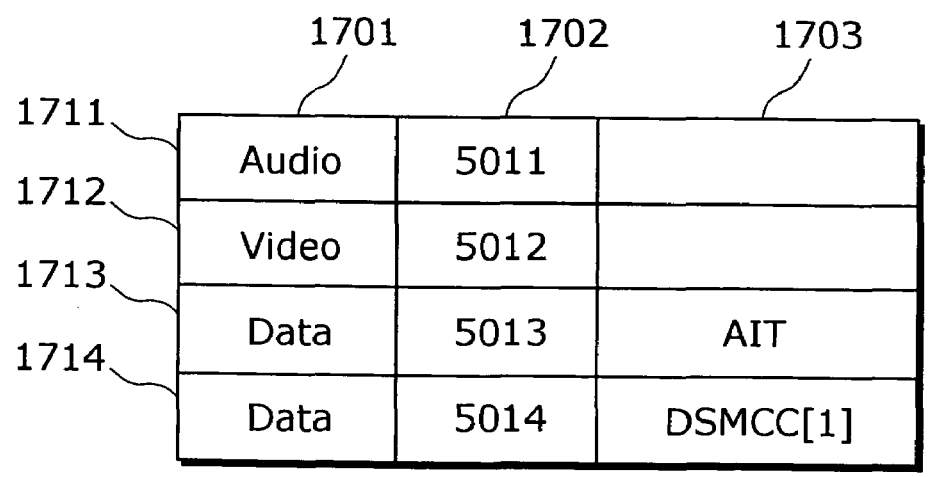
FIG. 18 is a schematic diagram showing the contents of a PMT specified in the MPEG2 standard according to the present invention.

First, the JMF 1205a obtains, from a PAT and a PMT, packet IDs used to specify the video and audio to be reproduced. PAT and PMT are tables defined by the MPEG-2 standard that show the program line-up included in an MPEG2 transport stream. PAT and PMT are carried in the payloads in packets included in an MPEG2 transport stream, together with audio and video. Refer to the specification for a detailed description of PAT and PMT. Here, only an overview of PAT and PMT is given. PAT, which is an abbreviation of Program Association Table, is carried in packets with the packet ID "0". In order to obtain the PAT, the JMF 1205a indicates, to the TS decoder 505, the packet ID "0" and the CPU 514 through the library 1201b of the OS 1201. Then, the TS decoder 505 performs filtering based on the packet ID "0", and passes the resultant to the CPU 514. Accordingly, the JMF 1205a can collect the PAT packets. FIG. 17 illustrates a table that schematically shows an example of the collected PAT information. A column 1601 describes program numbers. A column 1602 describes packet IDs. The packet IDs shown in the column 1602 are used to obtain the PAT. Each of lines 1611~1613 is a pair of the program number of a channel and a packet ID corresponding to it. Here, three channels are defined. The line 1611 defines a pair of the program number "101" and the packet ID "501". Assuming that the channel identifier provided to the JMF 1205a is "2", the JMF 1205a refers to the column 1412 in FIG. 15, so as to obtain the program number "102" corresponding to such channel identifier, and then refers to the column 1612 in the PAT shown in FIG. 17, so as to obtain the packet ID "502" corresponding to the program number "102". PMT, which is an abbreviation of Program Map Table, is carried in packets with the packet IDs specified in the PAT. In order to obtain the PMT, the JMF 1205a indicates, to the TS decoder 505, a packet ID and the CPU 514 through the library 1201b of the OS 1201. Here, a packet ID to be specified is "502". Then, the TS decoder 505 performs filtering based on the packet ID "502", and passes the resultant to the CPU 514. Accordingly, the JMF 1205a can collect the PMT packets. FIG. 18 illustrates a table that schematically shows an example of the collected PMT information. A column 1701 describes stream types. A column 1702 describes packet IDs. Information specified in the respective stream types is carried in the payloads of packets with the packet IDs specified in the column 1702. A column 1703 describes additional information. Each of lines 1711~1714 is a pair of a packet ID and the type of information being transmitted, which is known as an elementary stream. The line 1711, which is a pair of the stream type "audio" and the packet ID "5011", indicates that audio data is stored in the payload of the packet with the packet ID "5011". The JMF 1205a obtains, from the PMT, the packet IDs of the video and audio to be reproduced. Referring to FIG. 18, the JMF 1205a obtains the audio packet ID "5011" from the line 1711, and the video packet ID "5012" from the line 1712.

Then, the JMF 1205a passes the obtained audio packet ID and video packet ID to the AV reproduction 1201b3 of the library 1201b in the OS 1201. In response to this, the AV reproduction 1201b3 provides the TS decoder 505 with pairs of the obtained audio packet ID and the audio decoder 506 as an output destination as well as the obtained video packet ID and the video decoder 508 as an output destination. The TS decoder 505 performs filtering based on such provided packet IDs and the output destinations. Here, the packet with the packet ID "5011" is passed to the audio decoder 506 and the packet with the packet ID "5012" is passed to the video decoder 508. The audio decoder 506 performs digital-to-analog conversion on the provided packet, so as to reproduce the audio via the speaker 507. The video decoder 508 performs digital-to-analog conversion on the provided packet, so as to display the video on the display 509.

Finally, the service manager 1204 provides the channel identifier to an AM 1205b in the Java library 1205, so as to request for data broadcast reproduction. Here, data broadcast reproduction means to extract a Java program included in the MPEG2 transport stream and cause the JavaVM1203 to execute it. As a technique for embedding a Java program into an MPEG2 transport stream, a method known as DSMCC is used, which is described in the MPEG specification ISO/IEC138181-6. A detailed explanation of DSMCC is omitted here. DSMCC specification defines a method of encoding a file system comprised of directories and files used by a computer, in packets within an MPEG2 transport stream. Information about the Java program to be executed is carried in packets in the MPEG2 transport stream in the form of AIT. AIT is an abbreviation of Application Information Table whose definition is given in the tenth chapter of the DVB-MHP standard (formally known as ETSI TS 101 812 DVB-MHP specification V1.0.2).

First, in order to obtain the AIT, the AM 1205b obtains the PAT and PMT as in the case of the JMF 1205a, so as to obtain the packet ID of the packet that stores the AIT. Assuming that "2" is the provided channel identifier and that the PAT shown in FIG. 17 and the PMT shown in FIG. 18 are being transmitted, the AM 1205b obtains the PMT shown in FIG. 18 according to the same procedure followed by the JMF 1205a. Subsequently, the AM 1205b extracts, from the PMT, the packet ID of the elementary stream whose stream type is "Data" and which has "AIT" as additional information. As shown in FIG. 18, the elementary stream in the line 1713 corresponds to such elementary stream, and therefore the AM 1205b obtains the packet ID "5013" from it.

Figure 19:
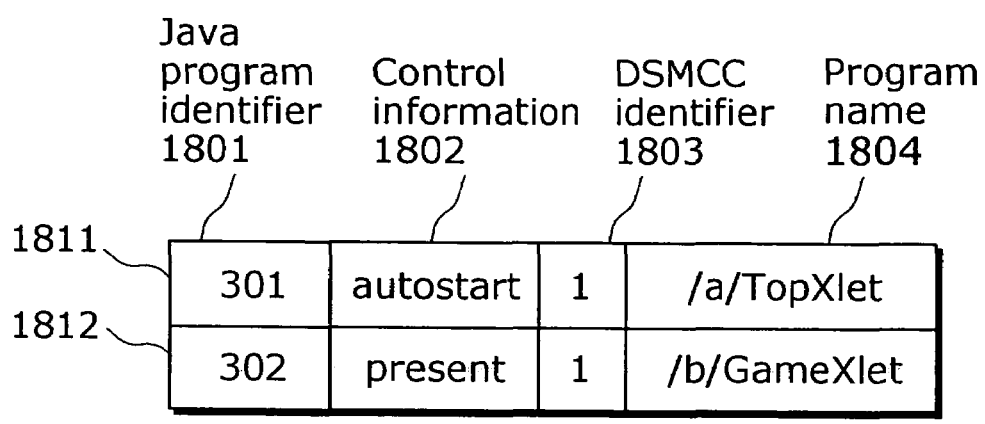
FIG. 19 is a schematic diagram showing the contents of an AIT specified in the DVB-MHP standard according to the present invention.

The AM 1205b provides the TS decoder 505 with the packet ID of the AIT and the CPU 514 as an output destination through the library 1201b of the OS 1201. Then, the TS decoder 505 performs filtering based on such provided packet ID, and passes the resultant to the CPU 514. Accordingly, the AM 1205b can collect the packets of AIT. FIG. 19 is a table that schematically shows an example of the collected AIT information. A column 1801 describes identifiers of Java programs. A column 1802 describes control information for controlling the Java programs. The control information includes "autostart", "present", and "kill". "autostart" means that the terminal apparatus 500 automatically executes the program promptly. "present" means that the program is not executed automatically. "kill" means that the program is to be terminated. A column 1803 describes DSMCC identifiers used to extract packet IDs that include Java programs in the DSMCC format. A column 1804 describes program names of the Java programs. Each of lines 1811 and 1812 is a set of information about a Java program. The Java program defined in the line 1811 is a set of an identifier "301", control information "autostart", a DSMCC identifier "1", and a program name "a/TopXlet". The Java program defined in the line 1812 is a set of an identifier "302", control information "present", a DSMCC identifier "1", and a program name "b/GameXlet". Here, these two Java programs have the same DSMCC identifier. This indicates that two Java programs are included in the file system which has been encoded according to the same DSMCC method. Here, only four pieces of information are specified for the respective Java programs, but more pieces of information are specified in actuality. Refer to the DVB-MHP specification for detail.

The AM 1205b finds the "autostart" Java program from the AIT, and extracts the corresponding DSMCC identifier and Java program name. Referring to FIG. 19, the AM 1205b extracts the Java program in the line 1811, and obtains the DSMCC identifier "1" and the Java program name "a/TopXlet".

Next, the AM 1205b obtains, from the PMT, the packet ID of packets that store Java programs in the DSMCC format, using the DSMCC identifier obtained from the AIT. More specifically, the AM 1205b obtains, from the PMT, the packet ID included in the elementary stream whose stream type is "Data" and whose DSMCC identifier in the additional information matches.

Here, assuming that such DSMCC identifier is "1" and the PMT is the one shown in FIG. 18, the elementary stream in the line 1714 satisfies the above condition. Therefore, the packet ID "5014" is to be extracted.

The AM 1205b indicates, to the TS decoder 505, the packet ID of packets in which data is embedded in the DSMCC format as well as the CPU 514 as an output destination through the library 1201b of the OS 1201. Here, the packet ID "5014" is provided. Then, the TS decoder 505 performs filtering based on the provided packet ID, and passes the resultant to the CPU 514. Accordingly, the AM 1205b can collect the required packets. The AM 1205b reconstructs the file system from the collected packets according to the DSMCC method, and stores the reconstructed file system into the primary storage unit 511. The process for extracting data such as the file system from packets in the MPEG2 transport and storing the extracted data into storage units such as the primary storage unit 511 is hereinafter called download.

Figure 20:
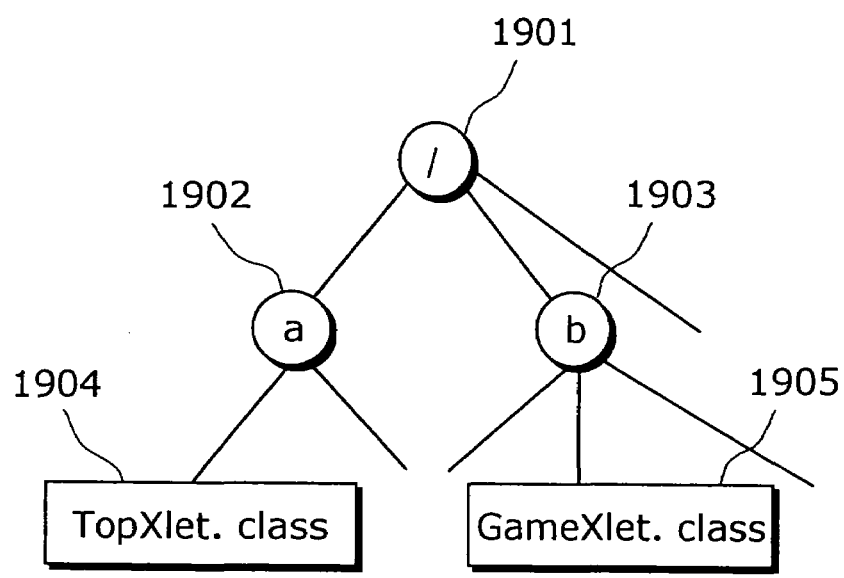
FIG. 20 is a schematic diagram showing a file system to be transmitted in the DSMCC format according to the present invention.

FIG. 20 shows an example of the downloaded file system. In the diagram, circles represent directories and squares represent files, where 1901 is a root directory, 1902 is a directory "a", 1903 is a directory "b", 1904 is a file "TopXlet.class", and 1905 is a file "GameXlet.class".

Subsequently, the AM 1205b passes, to the JavaVM 1203, a Java program to be executed out of the file system downloaded into the primary storage unit 511. Here, assuming that the Java program name to be executed is "a/TopXlet", a file "a/TopXlet. class" resulted from appending ". class" to the above Java program name is a file to be executed. "/" is a delimiter between a directory and a file name, and as shown in FIG. 20, the file 1904 is a Java program to be executed. Next, the AM 1205b passes the file 1904 to the JavaVM 1203.

The JavaVM 1203 executes such received Java program.

Upon receipt of the identifier of another channel, the service manager 1204 terminates the reproduction of the video and audio as well as the execution of the Java program which are being carried out through each library included in the Java library 1205, through each library included in the same Java library 1205, and then performs the reproduction of the video and audio as well as the execution of a Java program based on the newly received channel identifier.

Furthermore, the service manager 1204 is also capable of receiving a channel identifier from a Java program that is executed not only on the reproduction unit 1202b but also on the JavaVM 1203. More specifically, it provides a Java language class for receiving a channel identifier as well as its method. Upon receipt of a channel identifier, the service manager 1204 terminates the reproduction of the video and audio as well as the execution of the Java program which are being carried out through each library included in the Java library 1205, through each library included in the same Java library 1205, and then performs the reproduction of the video and audio as well as the execution of a Java program based on the newly received channel identifier. Moreover, the service manager 1204 also downloads/stores and executes a Java program.

The service manager 1204 carries out a bilateral communication with the head end 101 through the POD Lib 1205e included in the Java library 1205 after initialization processing of the POD finishes at activation time. This bilateral communication can be realized by the POD Lib 1205e through the use of the library 1201b of the OS 1201, as well as through the use of the QPSK demodulation unit 502 and the QPSK modulation unit 503 via the POD 504.

Through the above communication, the service manager 1204 receives, from the head end 101, information about Java programs which the terminal apparatus 500 should store in the secondary storage unit 510. Such information is called XAIT information. The XAIT information is transmitted between the head end 101 and the POD 504 in an arbitrary form. The present invention can be carried out regardless of transmission format, as long as information required as XAIT is included.

FIG. 21 illustrates a table that schematically shows an example of the XAIT information obtained from the head end 101. A column 2001 describes the identifiers of Java programs. A column 2002 describes control information for controlling the Java programs. The control information includes "autoselect" and "present". "autoselect" means that the program is executed automatically when the terminal apparatus 500 is powered on, and "present" means that the program is not to be executed automatically. A column 2003 describes DSMCC identifiers used to extract packet IDs that include Java programs in the DSMCC format. A column 2004 describes the program names of the Java programs. A column 2005 describes the priorities of the Java programs. Each of lines 2011 and 2012 is a set of information about the respective Java programs. The Java program defined in the line 2011 is a set of an identifier "701", control information "autoselect", a DSMCC identifier "1", and a program name "a/ZapperXlet". Here, only five pieces of information are specified for the respective Java programs, but the present invention can be carried out even when more pieces of information are defined.

Figure 22:
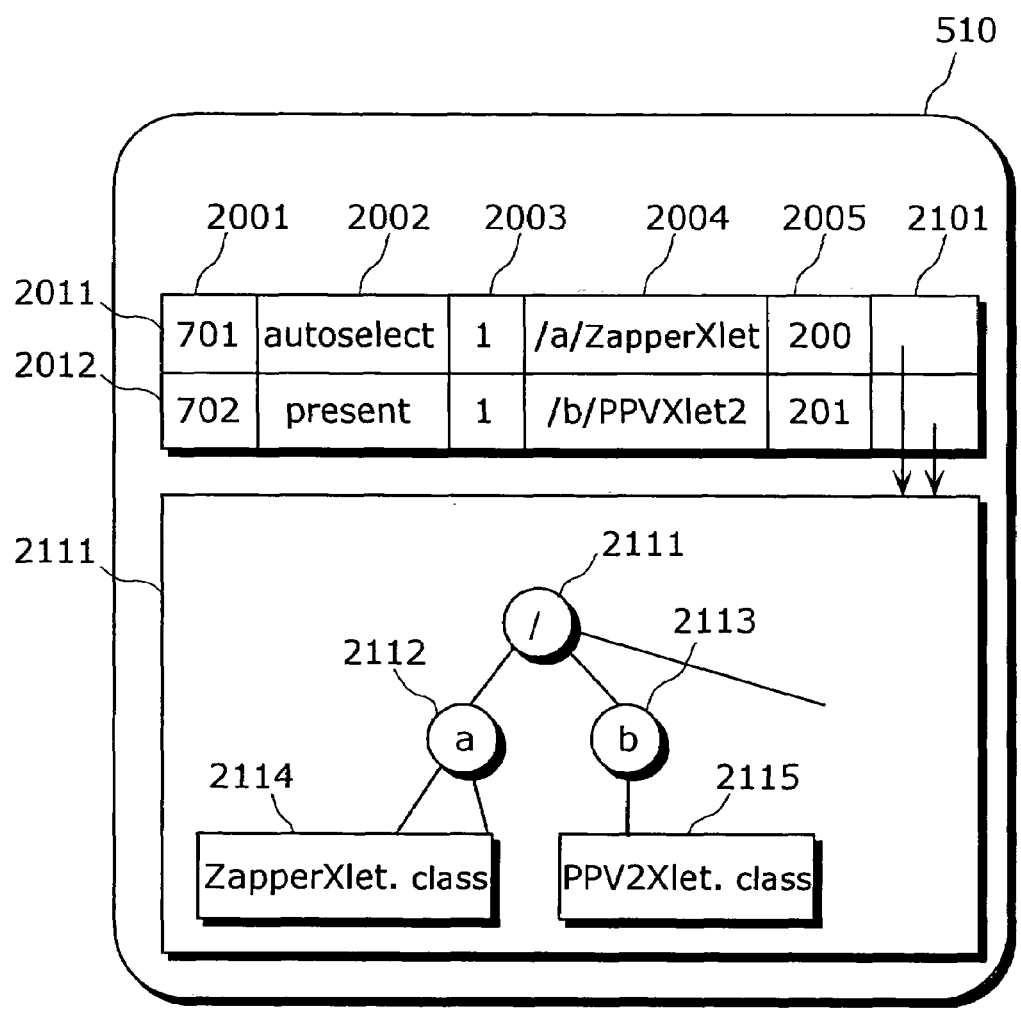
FIG. 22 shows an example of information stored in the secondary storage unit 510 according to the present invention.

On the receipt of the XAIT information, the service manager 1204 stores the file system from the MPEG2 transport stream into the primary storage unit 511, according to the same procedure as the one for downloading the Java program from the AIT information. Subsequently, the service manager 1204 copies such stored file system to the secondary storage unit 510. Note that it is also possible to download the file system not via the primary storage unit 511 but directly into the secondary storage unit 510. Next, the service manager 1204 stores, in the secondary storage unit 510, the result of associating the XAIT information with a storage position of the downloaded file system. FIG. 22 shows an example of the XAIT information and the downloaded file system stored in the secondary storage unit 510 in association with each other. Elements in FIG. 22 which are the same as those in FIG. 21 are the same as each other, and therefore an explanation for such elements is omitted. A column 2101 stores the storage position of the downloaded file system. In FIG. 22, such storage positions are indicated by arrows. 2110 is the downloaded file system, where a top directory 2111, a directory "a" 2112, a directory "b" 2113, a file "ZapperXlet. class" 2114, and a file "PPV2XIet. class" 2115 are included.

Here, the XAIT information is stored after the Java program is stored, but it is also possible for the XAIT information to be stored before the Java program.

When the terminal apparatus 500 is powered on, the OS 1201 indicates the service manager 1204 to the JavaVM 1203. Then, after activated by the JavaVM 1203, the service manager 1204 refers to the XAIT information which was stored in the secondary storage unit 510 first. Here, the service manager 1204 refers to the control information of each Java program, and passes the program "autoselect" to the JavaVM 1203, so as to activate such program. Referring to FIG. 22, the Java program "ZapperXlet" defined in the line 2011 is activated here.

The Java library 1205 is a collection of plural Java libraries stored in the ROM 512. In the present embodiment, the Java library 1205 includes the JMF 1205a, the AM 1205b, the Tuner 1205c, the CA 1205d, the POD Lib 1205e, a reproduction Lib 1205f, an IO 1205g, an AWT 1205h, and the like.

Descriptions on the functions of the JMF 1205a, the AM 1205b, the Tuner 1205c, the CA 1205d, and the POD Lib 1205e are omitted since they are already given hereinbefore.

The reproduction Lib 1205f provides a Java language class and a method (hereinafter described as Java API) for passing, to a Java program, the identifier of a currently reproduced channel stored in the secondary storage unit 510. The use of this Java API makes it possible for the Java program to know which channel is currently reproduced.

The IO 1205g provides the Java program with a Java API for allowing the Java program to write data to the secondary storage unit 510 or a Java API for allowing it to read such written data from the secondary storage unit 510. The use of this API makes it possible for the Java program to store arbitrary data into the secondary storage unit 510. Since such stored data will not be lost even when the power of the terminal apparatus 500 is turned off, it is possible to read such data again after the terminal apparatus 500 is turned on.

The AWT 1205h provides a Java API for allowing a Java program to perform rendering and to receive a key input notice from the input unit 513. More specifically, its equivalents are the java. awt package, the java. awt. event package, and other java. awt sub packages that are defined in "The Java class Libraries Second Edition, Volume 2" (ISBNO-201-31003-1). Here, detailed descriptions are omitted.

Next, descriptions are given of exceptional processing performed by the reproduction unit 1202b and the operation of the Java program "ZapperXlet" at power-on time of the terminal apparatus 500 which are major parts of the present invention.

Figure 23:
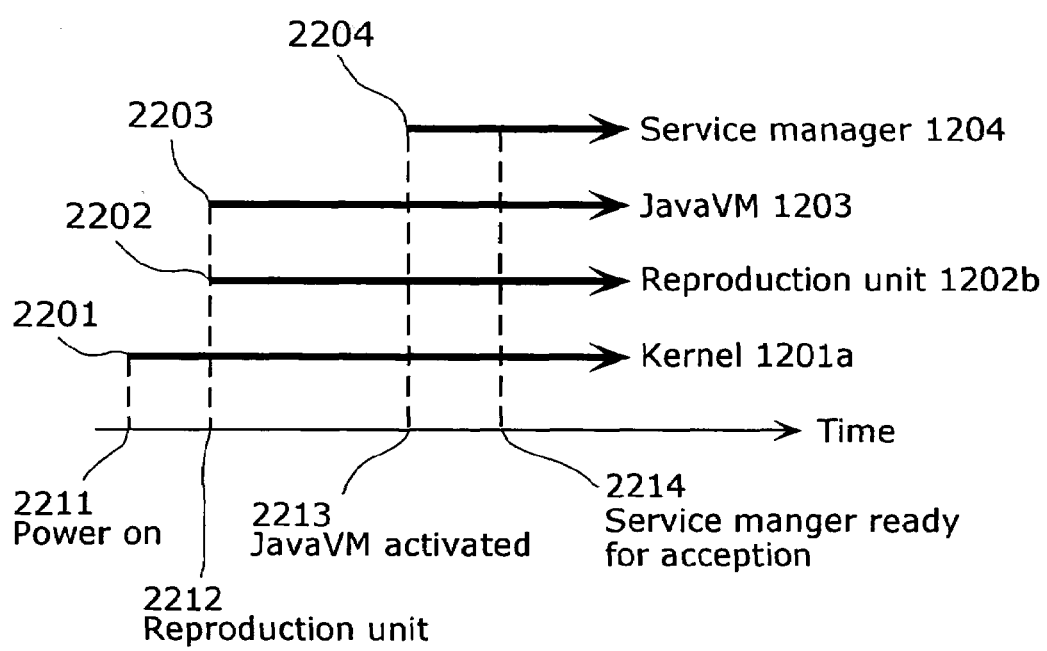
FIG. 23 is a schematic diagram showing an exemplary order in which a plurality of sub programs according to the present invention are activated.

FIG. 23 is a schematic diagram showing the order of activating major sub programs at power-on time of the terminal apparatus 500. In this drawing, lateral axes denote the passage of time. The left edge of an arrow 2201 denotes that the kernel 1201a is activated and that it keeps on operating after this activation. Similarly, the left edges of respective arrows 2202, 2203, and 2204 denote that the reproduction unit 1202b, the JavaVM 1203, and the service manager 1204 are activated respectively, and that they keep on operating after this activation.

2211 is the time when the terminal apparatus 500 is powered on. The kernel 1201a is activated at this time. The kernel 1201a, after completing self-initialization processing and others, activates the reproduction unit 1202b by activating the EPG 1202 at the time indicated by 2212, and activates the JavaVM 1203 at the same time. The JavaVM 1203, after completing self-initialization processing and others, activates the service manager 1204 at the time indicated by 2213. After completing self-initialization processing and others, it is possible for the service manager 1204 to receive the identifier of a channel to be reproduced, from the time indicated by 2214.

As is obvious from FIG. 23, the service manager 1204 cannot receive any identifiers between the time 2212 and the time 2214, even if the identifier of a channel that is wished to be reproduced is passed over to the service manager 1204. Therefore, the channel cannot be reproduced.

Therefore, from the time 2212 to the time 2214, the reproduction unit 1202b reproduces a channel by its own, without any instructions from the service manager.

The reproduction unit 1202b is capable of making a direct access to the library 1201b, which makes it possible for it to have the function equivalent to that of the Tuner 1205c, the CA 1205d and the JMF 1205c that make up the Java library 1205. First, upon activation, it reads out the identifier of a channel stored in the secondary storage unit 510. This channel identifier is the identifier of a channel which was reproduced last before the power is turned off. Alternatively, the secondary storage unit 510 may store the identifier of a specific channel to be reproduced at power-on time, and the reproduction unit 1202b may read such identifier.

Next, the reproduction unit 1202b refers to the channel information stored in the secondary storage unit 510 to obtain the tuning information. Assuming that a channel with the channel identifier "2" is wished to be reproduced now, referring to the line 1412 shown in FIG. 15, the tuning information "156 MHz" corresponding to the channel is obtained. The reproduction unit 1202b passes the tuning information to the QAM demodulation unit 501 via the tuner 1201b1 of the library 1201b in the OS 1201. The QAM demodulation unit 501 demodulates the signal sent from the head end 101 according to the provided tuning information, and passes the resultant signal to the POD 504.

Next, the reproduction unit 1202b provides the POD 504 with information required for descrambling through the conditional access 1201b2 of the library 1201b in the OS 1201. On the basis of the provided information, the POD 504 descrambles the signal provided from the QAM demodulation unit 501, and passes the resulting signal to the TS decoder 505.

Finally, the reproduction unit 1202b obtains the PAT and PMT information using the TS decoder 505, as in the case of the JMF 1205a, and obtains the packet IDs of audio and video to be reproduced. The reproduction unit 1202b passes the obtained audio packet ID and video packet ID to the AV reproduction 1201b3 of the library 1201b in the OS 1201. In response to this, the AV reproduction 1201b3 provides the TS decoder 505 with a set of the received audio packet ID and the audio decoder 506 as an output destination, as well as a set of the received video packet ID and the video decoder 508 as an output destination. The TS decoder 505 performs filtering based on the provided packet IDs and output destinations. The audio decoder 506 performs digital-to-analog conversion on the packet provided from the TS decoder 505, so as to reproduce the audio via the speaker 507. Meanwhile, the video decoder 508 performs digital-to-analog conversion on the packet provided from the TS decoder 505, so as to display the video on the display 509.

After the time 2214, the reproduction unit 1202b passes a channel identifier to the service manager 1204 as in the normal case. The reproduction unit 1202b can know the time when the service manager can receive a channel identifier, according to a notice from the service manager 1204. More specifically, the service manager 1204 calls a function prepared inside the reproduction unit 1202b. Alternatively, the reproduction unit 1204 may register a callback function with the service manager 1204, and the service manager 1204 may call such registered callback function. Or, the service manager 1204 may give the notice indirectly such as by providing a notice to the JavaVM 1203, which then gives a notice to the reproduction unit 1202b. Stated another way, the reproduction unit 1202b can know the time when the service manager 1204 can receive a channel identifier by a variety of methods. As a result, before the time 2214, only video and audio can be reproduced by the reproduction unit 1202b, whereas after the time 2214, a Java program included in the channel can also be executed by the service manager 1204 in addition to the reproduction of video and audio. By the terminal apparatus 500 utilizing the above-described exceptional processing performed by the reproduction unit 1202b at start-up time, it becomes possible to reproduce video and audio before the service manager 1204 is activated. As a result, it becomes possible to shorten, for the viewer, the waiting time of the user after the power is turned on. In other words, it becomes possible to shorten the time during which nothing is displayed on the screen although the power is turned on.

Here, it is also possible for the reproduction unit 1202b to receive an input from the user between the time 2212 to the time 2214 via the input unit 513. In this case, as descried above, the reproduction unit 1202b reproduces video and audio by its own, and at the same time, stores, into the secondary storage unit 510, the identifier of a channel that includes the video and audio being reproduced.

Figure 24:
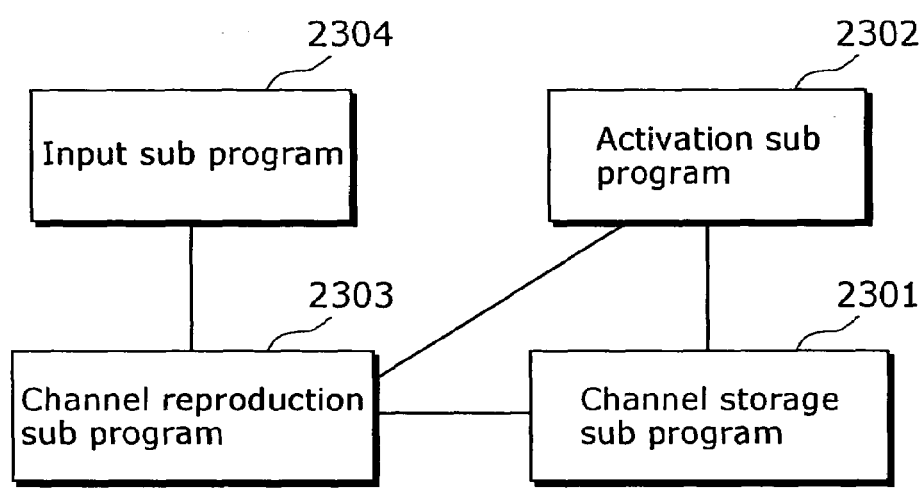
FIG. 24 shows an example structure of a Java program according to the present invention.

FIG. 24 is a diagram showing an example configuration of the Java program "ZapperXlet". The Java program "ZapperXlet" is comprised of four sub programs: a channel storage sub program 2301, an activation sub program 2302, a channel reproduction sub program 2303, and an input sub program 2304. The Java program "ZapperXlet", which is a Java program stored in the directory "a" 2112 shown in FIG. 22, is a program being stored in the secondary storage unit 510 and automatically activated when the service manager 1204 is activated.

The channel storage sub program 2301 stores a channel identifier managed by the Java program "ZapperXlet" via the IO 1205g of the Java library 1205. Furthermore, it reads out a stored channel identifier from the secondary storage unit 510. Here, an area in the secondary storage unit 510 used by the Java program "ZapperXlet" is different from an area used by the reproduction unit 1202b. In other words, two types of channel identifiers are stored in the secondary storage unit 510: a channel identifier to be stored by the reproduction unit 1202b and a channel identifier to be stored by the Java program "ZapperXlet".

The activation sub program 2302 is a sub program to be activated first when the Java program "ZapperXlet" is activated. First, the activation sub program 2302 calls the reproduction Lib 1205f, and obtains the channel identifier of a channel that is currently reproduced. Then, it passes the obtained channel identifier to the channel reproduction sub program 2303. At the same time, the activation sub program 2302 stores the value of it into the secondary storage unit 510 via the channel storage sub program 2301. However, when the reproduction of a channel is not carried out and the reproduction Lib 1205f does not return a channel identifier, the activation sub program 2302 reads a stored channel identifier from the secondary storage unit 510 via the channel storage sub program 2301, and passes it to the channel reproduction sub program 2303. Furthermore, when the second storage unit 510 does not store any channel identifiers here, the activation sub program 2302 passes, to the channel reproduction sub program 2303, the identifier of a predetermined default channel.

The channel reproduction sub program 2303 provides the service manager 1204 with the received channel identifier, so as to switch to another channel.

The input sub program 2304 receives a notice from the input unit 513 about a key inputted by the user via the AWT 1205h of the Java library 1205. More specifically, the input sub program 2304 receives the identifier of a key. The input sub program 2304 passes, to the channel reproduction sub program 2303, a channel identifier that corresponds to the received key identifier. Here, the present embodiment of the present invention is not limited by the correspondence between the key identifier and the channel identifier. The input unit 513 may be equipped with numeric keys starting from "0" to "9" so as to enable the user to input a number corresponding to the channel identifier, or a channel may be switched to another one at the press of the up-cursor button 1101 or the down-cursor button 1102, as in the case of the reproduction unit 1202b.

Here, when the Java program receives a key input of the user from the input unit 513 via the AWT 1205h, the reproduction unit 1202b cannot receive any key inputs of the user from the input unit 513.

Accordingly, while the Java program "ZapperXlet" is running, the Java program "ZapperXlet" can receive a key input of the user from the input unit 513 via the AWT 1205h and therefore can work equivalently to the reproduction unit 1202b. Furthermore, from this point of time, the reproduction unit 1202b does not work substantially since it cannot receive any inputs from the input unit 513, and therefore the program "ZapperXlet" inherits the operation of the reproduction unit 1202b.

As described above, by providing the reproduction Lib 1205f, it becomes possible for the Java program to obtain the identifier of a channel that is being reproduced by the reproduction unit 1202b, before the activation of the program "ZapperXlet". Accordingly, when a Java program has the functionality of the reproduction unit 1202b, it becomes possible for it to inherit and reproduce a channel which was reproduced by the reproduction unit 1202b. This makes it possible for such Java program to inherit the channel switching function, without confusing the user.

Figure 25:
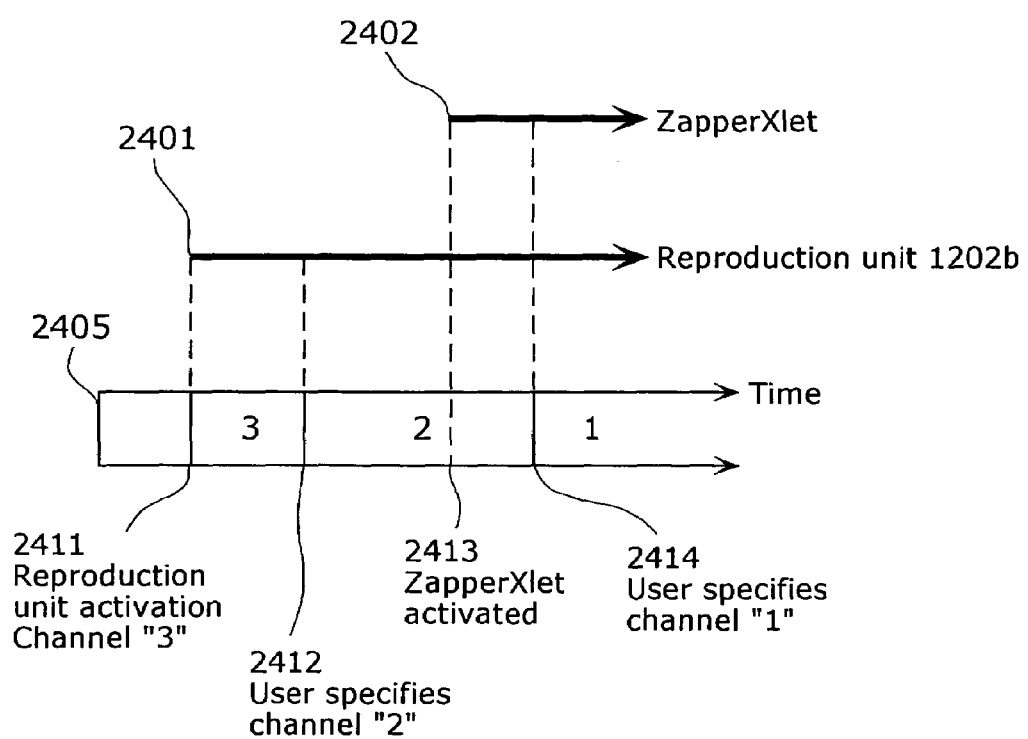
FIG. 25 is a schematic diagram showing an exemplary order in which a reproduction unit 1202b and the Java program according to the present invention are activated.

FIG. 25, which shows an example of effects provided by the reproduction Lib 1205f, is a schematic diagram showing the order in which the reproduction unit 1202b and the Java program "ZapperXlet" are activated at activation time of the terminal apparatus 500. In this drawing, lateral axes denote the passage of time. The left edge of an arrow 2401 denotes that the reproduction unit 1202*b* is activated and that it keeps on operating after this activation. Similarly, the left edge of an arrow 2402 denotes that the Java program "ZapperXlet" is activated, and that it keeps on operating after this activation. 2405 denotes the identifiers of channels that are actually reproduced at the respective points of time.

2405 denotes the identifiers of channels that are reproduced by the terminal apparatus 500 at the respective points of time. It is illustrated that a channel with the channel identifier "3" is reproduced between the time 2411 to the time 2412, a channel with the channel identifier "2" is reproduced between the time 2412 to the time 2414, and a channel with the channel identifier "1" is reproduced after the time 2414.

The time 2411 is the time when the reproduction unit 1202*b* is activated after the terminal apparatus 500 is powered on. Here, suppose that the reproduction unit 1202*b* reproduces a channel with the channel identifier "3" stored in the secondary storage unit 510. The time 2412 indicates that the user inputs to the input unit 513 an instruction to switch channels, and that the reproduction unit 1202*b* switches a channel that is being reproduced from the channel with the channel identifier "2" to the channel with the channel identifier "2". The time 2413 is the time when the Java program "ZapperXlet" is activated. Here, the Java program "ZapperXlet" knows, via the reproduction Lib 1205*f*, that the channel with the channel identifier "2" is being reproduced, and does not do anything. The time 2414 indicates that the user inputs to the input unit 513 an instruction to switch channels, and that the Java program "ZapperXlet" switches a channel that is being reproduced from the channel with the channel identifier "2" to the channel with the channel identifier "1".

Here, in order to compare and explain the effects provided by the present embodiment, consider the case where the reproduction Lib 1205*f* does not exist. Referring to FIG. 25, the reproduction program 1202*b* reproduces the channel with the channel identifier "3" at the time 2411, receives an instruction of the user at the time 2412 and reproduces a channel with the channel identifier "2". The Java program "ZapperXlet" reads out, at the time 2413, the identifier of a channel which it has stored into the secondary storage unit 510 using the channel storage sub program 2301, and reproduces the channel with such channel identifier. If the identifier of such channel is "4", the reproduction of the channel with the channel identifier "2" which the user has selected is suddenly suspended, and the reproduction of the channel with the channel identifier "4" starts. This surprises the user as well as requiring the user to select again the channel with the channel identifier "2" which s/he wishes to watch.

Here, consider another case where the reproduction Lib 1205*f* does not exist. Here, suppose that the Java program "ZapperXlet" does not reproduce any channels at activation time. Furthermore, in the case where the terminal apparatus 500 is a terminal which expects the Java program "ZapperXlet" to reproduce a channel and therefore the reproduction unit 1202*b* does not reproduce any channels, or the reproduction unit 1202 does not exist, no channel is automatically reproduced after the power is turned on. This is troublesome for the user since s/he always has to specify a channel after the power is turned on. Furthermore, it is difficult to judge whether the terminal is working normally or not. As described above, by employing the reproduction Lib 1205*f*, it becomes possible to present video and audio included in a channel to the user shortly after the terminal apparatus 500 is turned on, by causing the reproduction unit 1202*b* to perform, before the service manager 1204 is activated, a part of the operation that should be carried out by the Java program "ZapperXlet".

Figure 26:
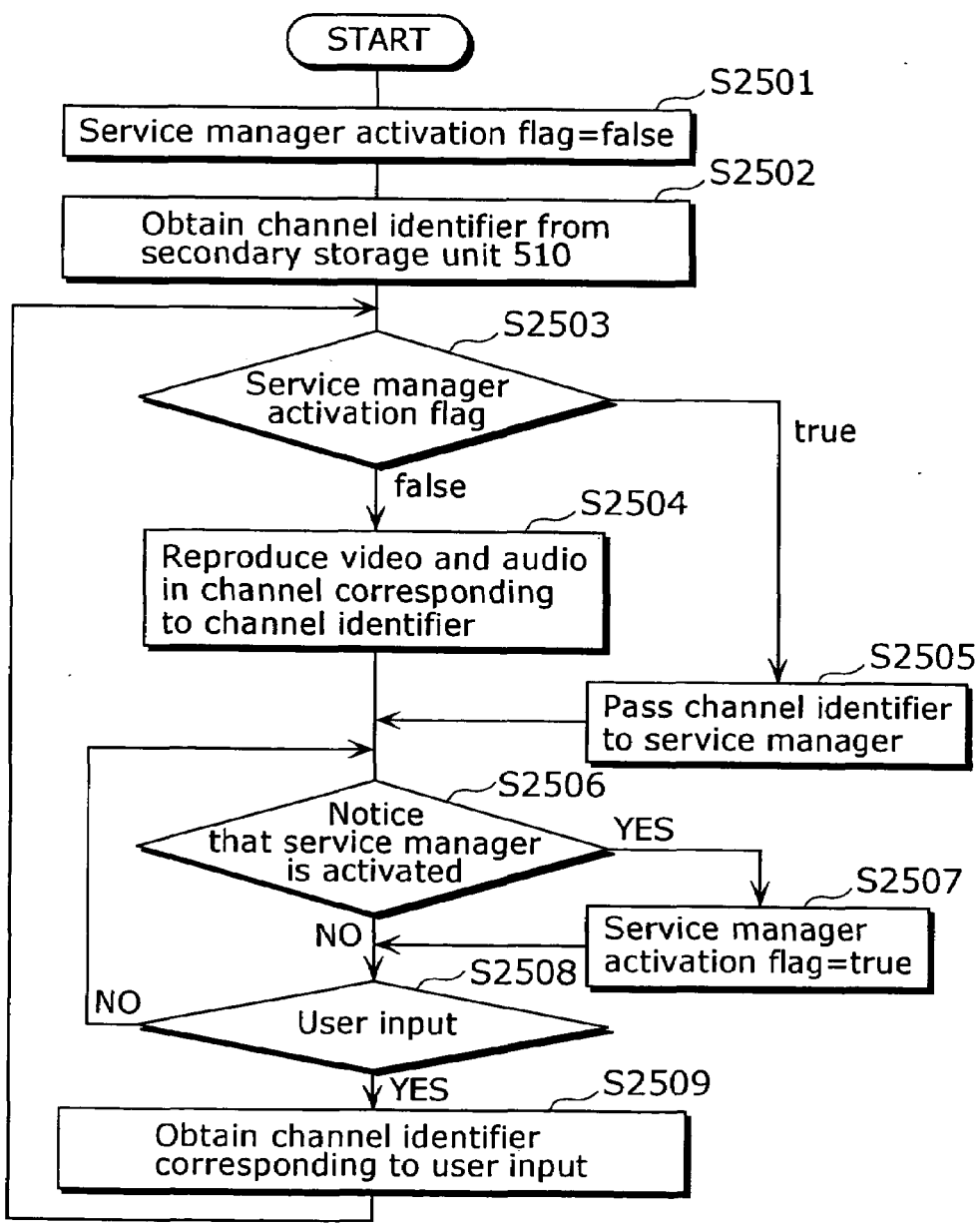
FIG. 26 is a flowchart showing an example operation of the reproduction unit 1202b according to the present invention.

FIG. 26 is a flowchart showing an example operation performed by the reproduction unit 1202*b* at activation time.

Referring to FIG. 26, when activated, the reproduction unit 1202*b* sets "false" to an internal variable "service manager activation flag" (Step S2501). Next, the reproduction unit 1202*b* extracts a channel identifier from the secondary storage unit 510 through the channel storage sub program (Step S2502). Referring to the value of the variable "service manager activation flag" (Step S2503), the reproduction unit 1202*b* reproduces video and audio included in a channel corresponding to the channel identifier which it has obtained when the value is "false" (Step S2504), whereas it passes the obtained channel identifier to the service manager 1204 to request for reproduction of the channel when the value is "true" (Step S2505).

Subsequently, upon receipt of a notice that the service manager 1204 has been activated (Step S2506), the reproduction unit 1202*b* sets "true" to the internal variable "service manager activation flag" (Step S2507). Or, upon receipt of an input from the user (Step S2508), the reproduction unit 1202*b* obtains or calculates a channel identifier corresponding to such input (Step S2509), switches the channel to be reproduced to another one by moving the control to Step S2503.

Figure 27:
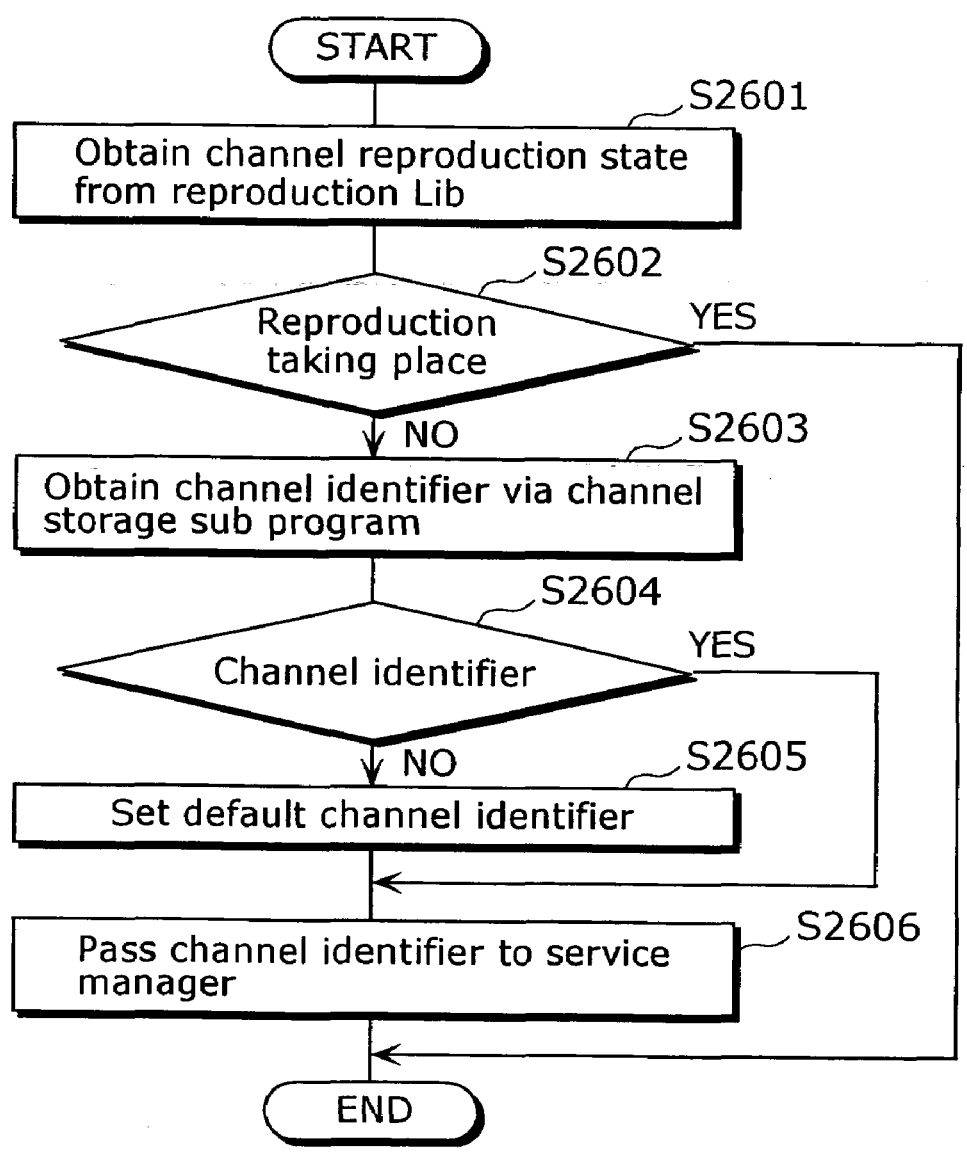
FIG. 27 is a flowchart showing an example operation of the Java program according to the present invention.

FIG. 27 is a flowchart showing an example operation of the Java program "ZapperXlet".

Referring to FIG. 27, the Java program "ZapperXlet" obtains, from the reproduction Lib 1205*f*, the reproduction state of a channel (Step S2601). When no channel is being reproduced (Step S2602), the Java program "ZapperXlet" obtains a channel identifier stored in the secondary storage unit 510 (Step S2603). When a channel identifier cannot be obtained (Step S2604), the Java program "ZapperXlet" uses a predetermined default value as a channel identifier (Step S2605). Then, the Java program "ZapperXlet" passes the channel identifier to the service manager to request for reproducing the channel (Step S2606).

Note that in the present embodiment, the reproduction unit 1202*b* reproduces only video and audio, but it may also reproduce subtitles, teletexts, closed captions, and others. In order to achieve this, the terminal apparatus 500 should be equipped with sub reproduction modules for reproducing subtitles, teletexts, and closed captions, and the reproduction unit 1202*b* should pass information required for these sub reproduction modules.

Furthermore, the present embodiment presents an example in which the reproduction unit 1202*b* performs a part of the function of the Java program "ZapperXlet" ahead of it in the reproduction of video and audio, but it is also applicable to another operation object. For example, in the reproduction of an animation, the present embodiment is also applicable to the case where a sub program stored in the terminal apparatus displays only the first frame of the animation, and the Java program inherits and displays the subsequent frames. In this case, a mechanism is equipped in the terminal apparatus for notifying the Java program of the state of display performed by the sub program stored in the terminal apparatus.

Furthermore, in the present embodiment, when the lava program receives a key input of the user from the input unit 513 via the AWT 1205*h*, the reproduction unit 1202*b* cannot receive any key inputs of the user from the input unit 513. In order to implement this, the Java library 1205 may be equipped with a reproduction unit termination Lib for explicitly terminating the operation of the reproduction unit 1202b. By calling this reproduction unit termination Lib, the Java program can terminate the operation of the reproduction unit 1202b so as to terminate the reproduction of a channel performed by the reproduction unit 1202b. Alternatively, the same effect can be achieved if the reproduction unit termination Lib is designed not to notify the reproduction unit 1202b of an input of the user from the input unit 513.

This reproduction unit termination Lib is capable of being used not only for the reproduction unit 1202b, but also for when a downloaded Java program wishes to terminate the function of a pre-stored sub program and to replace such function with the function of the Java program. More specifically, the Java program may indicate, to the reproduction termination Lib, a function which it wishes to terminate.

SECOND EMBODIMENT

The present embodiment is different from the first embodiment in the operation of the Java program "ZapperXlet".

Figure 28:
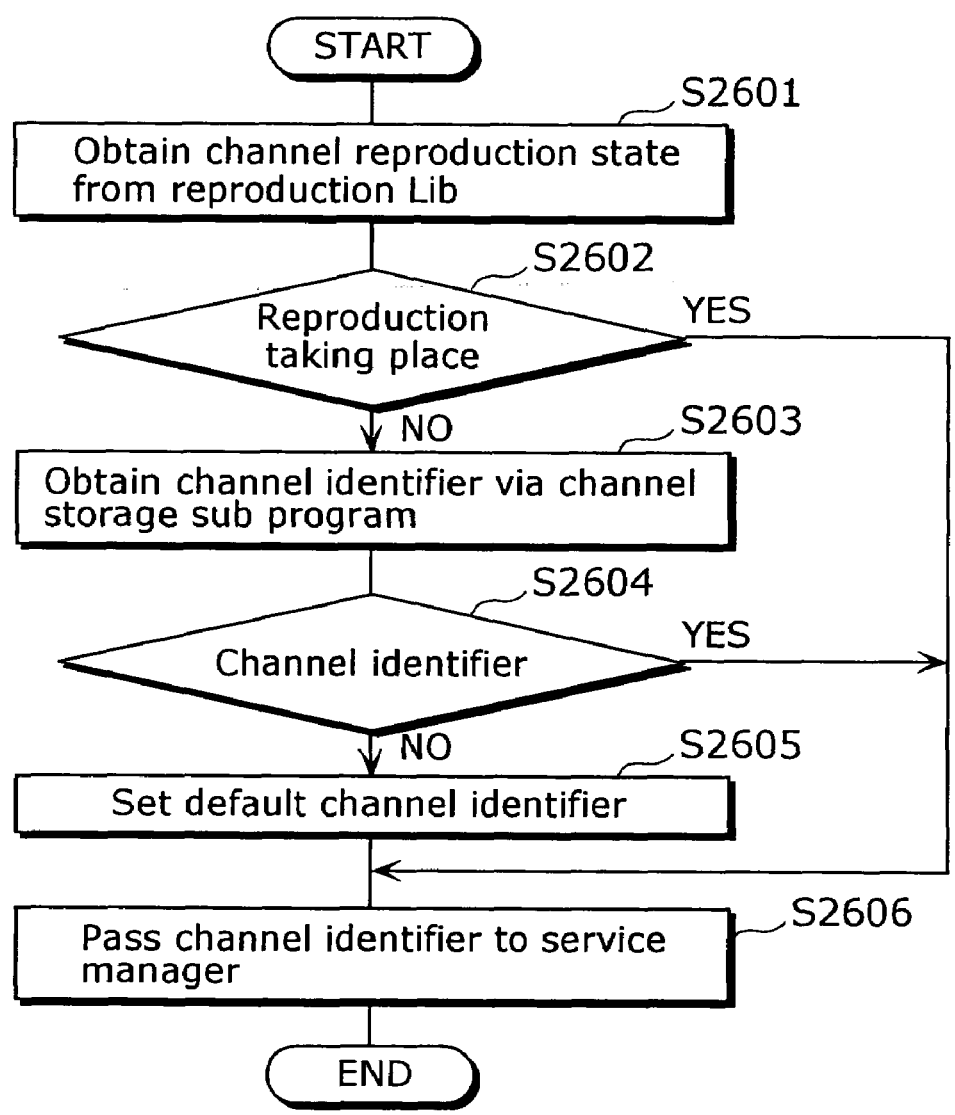
FIG. 28 is a flowchart showing an example operation of the Java program according to the present invention.

FIG. 28 is a flowchart showing an example operation of the Java program "ZapperXlet". The operations in steps which are assigned the same reference numbers as those of the first embodiment are the same as the first embodiment, and therefore descriptions thereof are omitted. The difference from the first embodiment is that, in Step S2602, processing is moved to Step S2606 when a channel is being reproduced (YES in the drawing), and the identifier of such channel being reproduced is passed to the service manager 1204 to request for reproduction.

As a result, while video and audio to be reproduced are the same, it becomes possible to execute a Java program defined in the channel.

Also in the present embodiment, since the Java program "ZapperXlet" calls the service manager 1204 in Step S2606 in spite that the channel is the same, the reproduction of video and audio is terminated once, and then the same video and audio will be reproduced again after that. This means that video and audio are subject to interruption. In order to circumvent this, the service manager 1204, referring to the reproduction Lib 1205f, may not have to reproduce video and audio again when the identifier of the channel being reproduced and a channel identifier received from the Java program are the same. Accordingly, it becomes possible for video and audio to be free from interruption. Alternatively, the same effect can be achieved if not the service manager 1204 but the JMF 1205a refers to the reproduction Lib 1205f and may not reproduce video and audio again when the identifier of the channel being reproduced and a channel identifier received from the service manager 1204 are the same. In other words, the same effect can be achieved if the service manager 1204, upon receipt of a channel identifier, refers to the reproduction Lib 1205f using a sub program required for reproducing video and audio, and does not reproduce video and audio again when the identifier of the channel being reproduced and a channel identifier received by the service manager 1204 are the same.

THIRD EMBODIMENT

In the first embodiment, the reproduction unit 1202b performs a branch between processing until when the service manager 1204 becomes ready to receive a channel identifier and processing after it becomes ready to receive a channel identifier.

This is absorbed by providing a channel identifier receiving unit.

Figure 29:
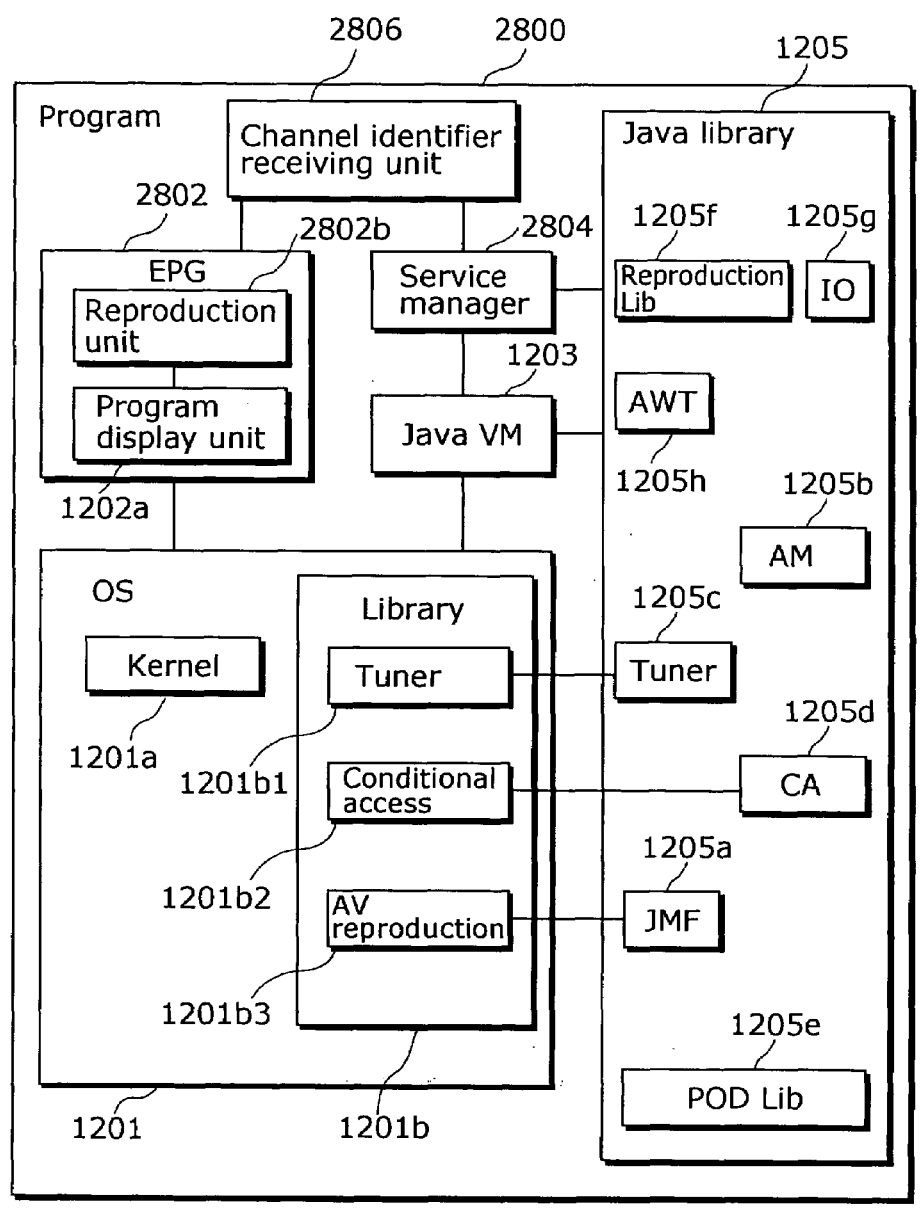
FIG. 29 is a diagram showing an example structure of a program stored in a terminal apparatus 2800 according to the present invention.

FIG. 29 is a diagram showing the structure of a program 2800 to be executed by the CUP 514 in the present embodiment.

The program 2800 is made up of plural sub programs. More particularly, it is made up of the OS 1201, an EPG 2802, the JavaVM 1203, a service manager 2804, the Java library 1205, and the channel identifier receiving unit 2806.

In the following, consistent elements that are assigned the same reference numbers as those in the first embodiment play the same roles, and therefore descriptions thereof are omitted.

The EPG 2802 is made up of the program display unit 1202a for displaying a list of programs to the user as well as for accepting an input from the user, and a reproduction unit 2802b for selecting channels. When reproducing a channel, the reproduction unit 2802b passes the channel identifier to the channel identifier receiving unit 2806 to request for reproducing the channel. The reproduction unit 2802b does not operate in consideration of the state of the service manager 1204, or does not reproduce video and audio after updating the PAT and PMT by itself.

The service manager 2804 is different from the service manager 1204 in the first embodiment in that it receives a channel identifier not from the reproduction unit 1202b but from the channel identifier receiving unit 2806. The other operations are the same.

The channel identifier receiving unit 2806 receives a channel identifier from the reproduction unit 2802b.

During the state in which the service manager 2804 cannot receive any channel identifiers, the channel identifier receiving unit 2806 is capable of working equivalently to the Tuner 1205c, the CA 1205d, and the JMF 1205c. The channel identifier receiving unit 2806 refers to the channel information stored in the secondary storage unit 510 to obtain tuning information that corresponds to the provided channel identifier. Assuming that a channel with the channel identifier "2" is wished to be reproduced now, referring to the line 1412 shown in FIG. 15, the tuning information "156 MHz" corresponding to the channel is obtained. The channel identifier receiving unit 2806 passes the tuning information to the QAM demodulation unit 501 via the tuner 1201b1 of the library 1201b in the OS 1201. The QAM demodulation unit 501 demodulates the signal sent from the head end 101 according to the provided tuning information, and passes the resultant signal to the POD 504.

Next, the channel identifier receiving unit 2806 provides the POD 504 with information required for descrambling, via the conditional access 1201b2 of the library 1201b in the OS 1201. On the basis of the provided information, the POD 504 descrambles the signal provided from the QAM demodulation unit 501, and passes the resulting signal to the TS decoder 505.

Finally, the channel identifier receiving unit 2806 obtains the PAT and PMT information using the TS decoder 505, as in the case of the JMF 1205a, and obtains the packet IDs of audio and video to be reproduced. The channel identifier receiving unit 2806 passes the obtained audio packet ID and video packet ID to the AV reproduction 1201b3 of the library 1201b in the OS 1201. In response to this, the AV reproduction 1201b3 provides the TS decoder 505 with a set of the received audio packet ID and the audio decoder 506 as an output destination, as well as a set of the received video packet ID and the video decoder 508 as an output destination. The TS decoder 505 performs filtering based on the provided packet IDs and output destinations. The audio decoder 506 performs digital-to-analog conversion on the packet provided from the TS decoder 505, so as to reproduce the audio via the speaker 507. Meanwhile, the video decoder 508 performs digital-to-analog conversion on the packet provided from the TS decoder 505, so as to display the video on the display 509.

After the service manager 2804 becomes ready to receive a channel identifier, the channel identifier receiving unit 2806 passes a channel identifier to the service manager 2804 as in the normal case. The channel identifier receiving unit 2806 can know the time when the service manager 2804 can receive a channel identifier, according to a notice from the service manager 2804. More specifically, the service manager 2804 calls a function prepared inside the channel identifier receiving unit 2806. Alternatively, the channel identifier receiving unit 2806 may register a callback function with the service manager 2804, and the service manager 2804 may call such registered callback function. Or, the service manager 2804 may give the notice indirectly, such as by providing a notice to the JavaVM 1203, which then gives a notice to the channel identifier receiving unit 2806. Stated another way, the channel identifier receiving unit 2806 can know the time when the service manager 2804 can receive a channel identifier by a variety of methods. By the channel identifier receiving unit 2806 operating in consideration of the state of the service manager 2804, the reproduction unit 2802b always has to perform in the same manner when receiving an input of the user from the input unit 513. This makes it possible to implement the reproduction unit 2802b using a fewer number of execution codes as well as a smaller amount of manpower than those of the reproduction unit 1202b in the first embodiment.

Furthermore, the channel identifier receiving unit 2806 stores the lastly accepted channel identifier into the secondary storage unit 510. Then, when the service manager 2804 becomes ready to accept a channel identifier, the channel identifier receiving unit 2806 passes a channel identifier stored in the secondary storage unit 510 to the service manager 2804 to request for reproducing the channel. Accordingly, it becomes possible to activate a Java program included in the channel, even when there is no such a Java program as the Java program "ZapperXlet" described in the second embodiment.

Note that as in the case of the first embodiment, the present embodiment according to the present invention is not limited by means by which the channel identifier receiving unit 2806 knows that the service manager 2804 becomes ready to receive a channel identifier. The channel identifier receiving unit 2806 can know that the service manager 2804 becomes ready to receive a channel identifier by a variety of methods described in the first embodiment.

Figure 30:
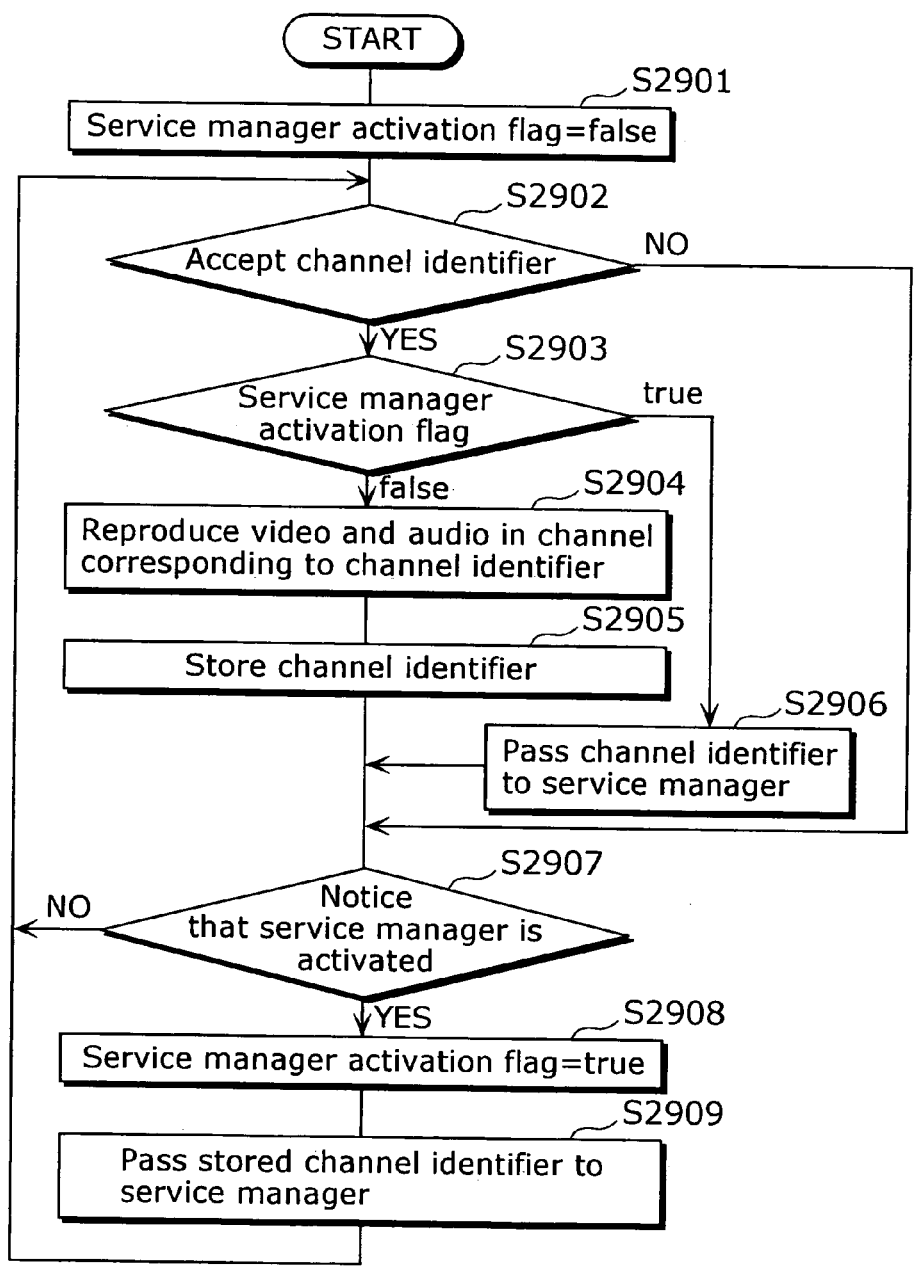
FIG. 30 is a flowchart showing an example operation of a channel identifier receiving unit 2806 according to the present invention.

FIG. 30 is a flowchart showing an example operation performed by the channel identifier receiving unit 2806.

Referring to FIG. 30, when activated, the channel identifier receiving unit 2806 sets "false" to an internal variable "service manager activation flag" (Step S2901). Next, upon receipt of a channel identifier (Step S2902), the channel identifier receiving unit 2806 refers to the value of the variable "service manager activation flag" (Step S2903). The channel identifier receiving unit 2806 reproduces video and audio included in a channel corresponding to the channel identifier which it has obtained when the value is "false" (Step S2904), and stores the accepted channel identifier into the secondary storage unit 510 (Step S2905). Meanwhile, it passes the accepted channel identifier to the service manager 2804 to request for reproduction of the channel when the value is "true" (Step S2906).

Subsequently, upon receipt of a notice that the service manager 2804 has been activated (Step S2907), the channel identifier receiving unit 2806 sets "true" to the internal variable "service manager activation flag" (Step S2908). Furthermore, the channel identifier receiving unit 2806 passes, to the service manager 2804, the channel identifier which was last stored into the secondary storage unit 510, so as to request for reproducing the channel (Step S2909).

Note that the applications described below are possible through the first, second, and third embodiments.

It is possible to omit the ROM 512 by storing information stored in the ROM 512 into the secondary storage unit 510. Furthermore, it is also possible that the secondary storage unit 510 is made up of plural sub secondary storage units, and each sub secondary storage unit stores different information, so that information can be stored in segments. For example, one sub secondary storage unit may store only tuning information, another sub secondary storage unit may store the library 1201b of the OS 1201, and further another different sub secondary storage unit may store a downloaded Java program.

The present invention is applicable to apparatuses, provided that they are information apparatuses such as personal computers and mobile phones.

Also, the present invention is applicable to satellite and terrestrial distributions. The general configuration in this case is the one in which the QAM demodulation unit 501 is replaced by an appropriate demodulation unit, which is then directly connected to the TS decoder. In this case, the QPSK demodulation unit 502, the QPSK modulation unit 503, and the POD 504 are not necessary. The system for communications to the head end is implemented by adding constituent elements such as a modem.

Furthermore, the POD 504 is detachable in the above embodiments, but it is also possible to carry out the present invention if the POD 504 is embedded. When the POD 504 is embedded, the CPU 706 of the POD 504 may be removed and the CPU 514 performs the operation of the CPU 706.

Moreover, it is also possible to carry out the present invention if not only a downloaded Java program but also a pre-stored Java program is to be registered in the POD Lib 1205e. Furthermore, it is also possible to provide a slot unit for inserting/ejecting a detachable storage medium such as an SD memory card, so as to load Java programs. Also, a network unit to get connected to a network may be provided, so as to load Java programs from the Internet.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is suited for use as an apparatus and the like for executing programs, and more particularly as a program executing apparatus and the like, such as digital television receiver, that downloads a program via a communication path and the like and executers such downloaded program.

The invention claimed is:

1. A broadcast receiving apparatus comprising:
a Java VM that executes a Java program;
a downloader configured to download the Java program;
an input unit configured to accept an input;
a receiver configured to receive a broadcast;
a channel reproduction unit configured to reproduce a channel included in the broadcast received by the receiver;
a reproduction program that comprises an embedded program that notifies the channel reproduction unit of a channel to be reproduced, based on an instruction from the input unit;
an execution unit configured to execute the reproduction program and the Java VM; and
an information provision unit configured to provide the Java program with a channel identifier of a channel that is last notified to the channel reproduction unit by the reproduction program, the Java program being executed by the Java VM,
wherein the information provision unit includes a storage unit that temporarily stores the channel identifier to be transmitted from the reproduction program to the Java program, the channel identifier being transmitted through the storage unit.

2. The broadcast receiving apparatus according to claim 1, further comprising:
a first storage unit configured to store the Java program; and
a second storage unit configured to store the reproduction program.

3. The broadcast receiving apparatus according to claim 1, wherein the channel reproduction unit reproduces video and audio included in the channel.

4. The broadcast receiving apparatus according to claim 1, wherein the broadcast includes a Java program, and the broadcast receiving apparatus further comprises a service reproduction unit configured to reproduce video, audio, and the Java program that are included in the channel.

5. The broadcast receiving apparatus according to claim 4, wherein the service reproduction unit is at least partially executed by the Java VM, and accepts a service to be reproduced from the Java program.

6. The broadcast receiving apparatus according to claim 5, wherein the service reproduction unit accepts the service to be reproduced from the reproduction program, and
the reproduction program reproduces the channel using the channel reproduction unit when the service reproduction unit does not accept the service to be reproduced, and reproduces the channel using the service reproduction unit when the service reproduction unit accepts the service to be reproduced.

7. The broadcast receiving apparatus according to claim 4, further comprising a service acceptance start notifier configured to notify that the service reproduction unit has started to accept a service to be reproduced.

8. A broadcast receiving apparatus comprising:
a Java VM that executes a Java program;
a downloader configured to download the Java program;
an input unit configured to accept an input;
a receiver configured to receive a broadcast;
a channel reproduction unit configured to reproduce video and audio included in a channel that is included in the broadcast received by the receiver;
a service reproduction unit configured to reproduce video, audio and data included in the channel that is included in the broadcast received by the receiver
a channel identifier accepting unit configured to receive an identifier of a channel to be reproduced and to reproduce the channel using the service reproduction unit when it is possible for the service reproduction unit to reproduce a channel, and to reproduce the channel using the channel reproduction unit when it is impossible for the service reproduction unit to reproduce a channel;
a reproduction program comprising an embedded program that notifies the channel identifier accepting unit of the identifier of the channel to be reproduced, based on an instruction from the input unit;
an execution unit configured to execute the reproduction program and the Java program; and
an information provision unit configured to provide the Java program with the identifier of the channel that is last notified to the channel identifier accepting unit by the reproduction program, the Java program being executed by the Java VM.

9. The broadcast receiving apparatus according to claim 8, further comprising a channel identifier storage unit configured to store the identifier of the channel accepted by the channel identifier accepting unit,
wherein the channel identifier accepting unit provides the service reproduction unit with the identifier of the channel stored in the channel identifier storage unit, when it becomes possible for the service reproduction unit to reproduce a channel, and reproduces the channel.

10. A computer-readable recording medium storing a computer program, comprising:
a Java VM that executes a Java program; and
an embedded program having a partial function that is a part of a function of the Java program;
whereby information that has been generated as a result of running of the embedded program can be provided to the Java program by an information provision unit.

11. The broadcast receiving apparatus according to claim 1, wherein the information provision unit provides the Java program with information when the Java program is activated, the information having been generated as a result of running the embedded program before the Java program is activated.

* * * * *